(12) United States Patent
Sowers

(10) Patent No.: US 11,154,017 B2
(45) Date of Patent: Oct. 26, 2021

(54) TREE-WATERING DEVICE, SYSTEM AND METHOD

(71) Applicant: Richard E Sowers, Fullerton, CA (US)

(72) Inventor: Richard E Sowers, Fullerton, CA (US)

(*) Notice: Subject to any disclaimer, the term of this patent is extended or adjusted under 35 U.S.C. 154(b) by 319 days.

(21) Appl. No.: 16/292,290

(22) Filed: Mar. 4, 2019

(65) Prior Publication Data

US 2019/0307085 A1    Oct. 10, 2019

Related U.S. Application Data

(60) Provisional application No. 62/766,605, filed on Dec. 13, 2018, provisional application No. 62/638,886, filed on Mar. 5, 2018.

(51) Int. Cl.
*A01G 25/06* (2006.01)
*A01G 13/02* (2006.01)

(52) U.S. Cl.
CPC ......... *A01G 25/06* (2013.01); *A01G 13/0237* (2013.01)

(58) Field of Classification Search
CPC ... A01G 25/02; A01G 25/026; A01G 13/0237
See application file for complete search history.

(56) References Cited

U.S. PATENT DOCUMENTS 2,875,713 A * 3/1959 Shoffner ............... A01G 29/00
111/7.1
3,345,774 A * 10/1967 Delbuguet ............. A01G 29/00
47/48.5
4,995,191 A * 2/1991 Davis ................. A01G 13/0237
47/32

(Continued)

FOREIGN PATENT DOCUMENTS

CA        2863935 A1 *  3/2016  ............. A01G 25/16
WO   WO-9526627 A1 * 10/1995  ............... A01G 9/28

(Continued)

OTHER PUBLICATIONS

Century Products, Welcome page of website, and Introductory Letter of Century Root Barrier, Hardscape Protection, 10 pages, May 22, 2019.

*Primary Examiner* — Monica L Barlow
*Assistant Examiner* — Aaron M Rodziwicz
(74) *Attorney, Agent, or Firm* — John J. Connors; Connors & Assoc. pc

(57) ABSTRACT

A system and method employ a pair of conventional water barrier panels connected to my tree-watering device. The tree-watering device and panels have interactive connectors configured to enable connection together. In a vertical orientation the barrier panels are sunk into the ground in which a tree is planted and below the ground surface, positioning the panels nearby each other to at least partially encompass roots of the tree. In a vertical orientation sinking the tree-watering device into the ground. A top end of my device is at or near the ground surface. A lower portion of my device has one or more openings therein facing the tree and being at least 12 inches below the ground surface. Lastly, introducing pressurized water into the interior of the tubular member so waters flows out the sidewall of the tubular member through the openings therein towards the tree.

8 Claims, 16 Drawing Sheets

(56) References Cited

U.S. PATENT DOCUMENTS

| | | | | |
|---|---|---|---|---|
| 5,070,642 A * | 12/1991 | Albrecht | ............ | A01G 13/0237 47/32.7 |
| 5,901,497 A * | 5/1999 | Bulvin | .................. | A01G 9/122 47/48.5 |
| 8,065,832 B2 * | 11/2011 | King | ...................... | A01G 29/00 47/48.5 |
| 8,132,362 B2 * | 3/2012 | King | ...................... | A01G 29/00 47/48.5 |
| 8,413,372 B2 * | 4/2013 | King | ...................... | A01G 29/00 47/48.5 |
| 2003/0221364 A1 * | 12/2003 | Mello | .................. | A01G 17/04 47/32.7 |
| 2007/0266626 A1 * | 11/2007 | Dworzan | ........... | A01G 13/0237 47/32.7 |
| 2017/0188525 A1 * | 7/2017 | Paige, Sr. | ................ | A01G 9/12 |
| 2018/0084739 A1 * | 3/2018 | Bottari | ............... | A01G 13/0237 |

FOREIGN PATENT DOCUMENTS

| | | | | |
|---|---|---|---|---|
| WO | WO-2013067583 A1 * | 5/2013 | ......... | A01G 13/0237 |
| WO | WO-2016164312 A1 * | 10/2016 | ............. | E01C 9/005 |
| WO | WO-2017068592 A1 * | 4/2017 | ............. | A01G 9/029 |

\* cited by examiner

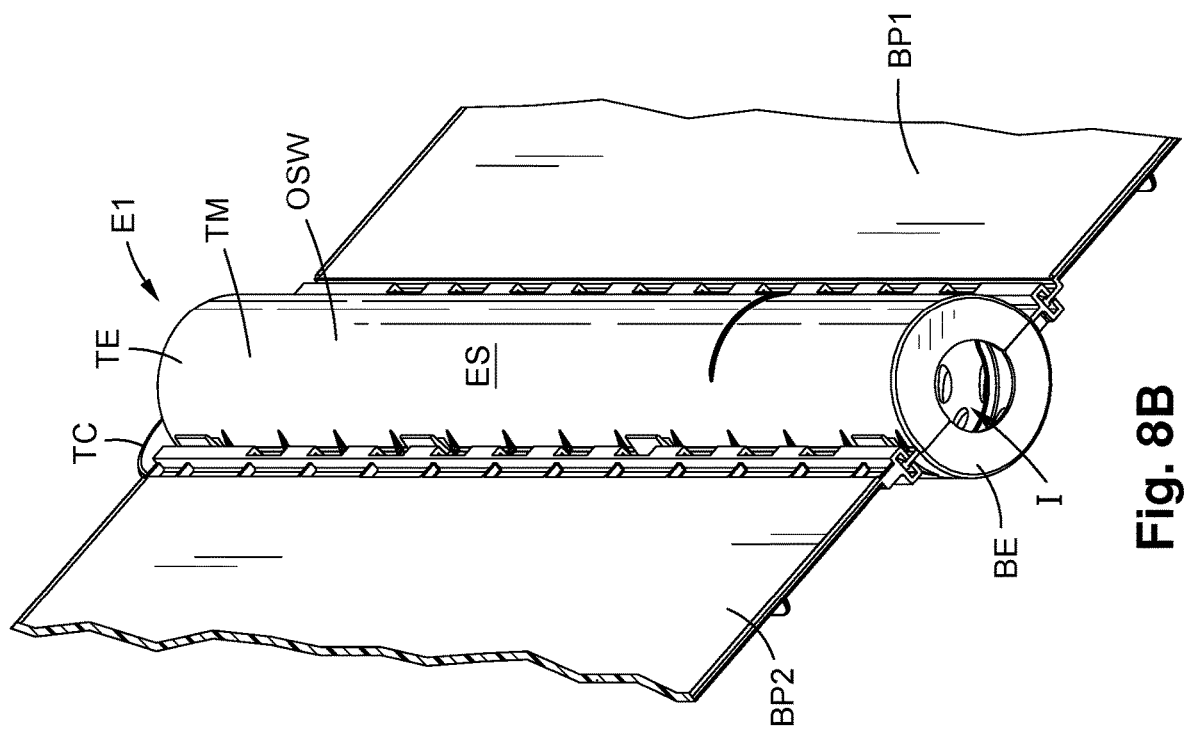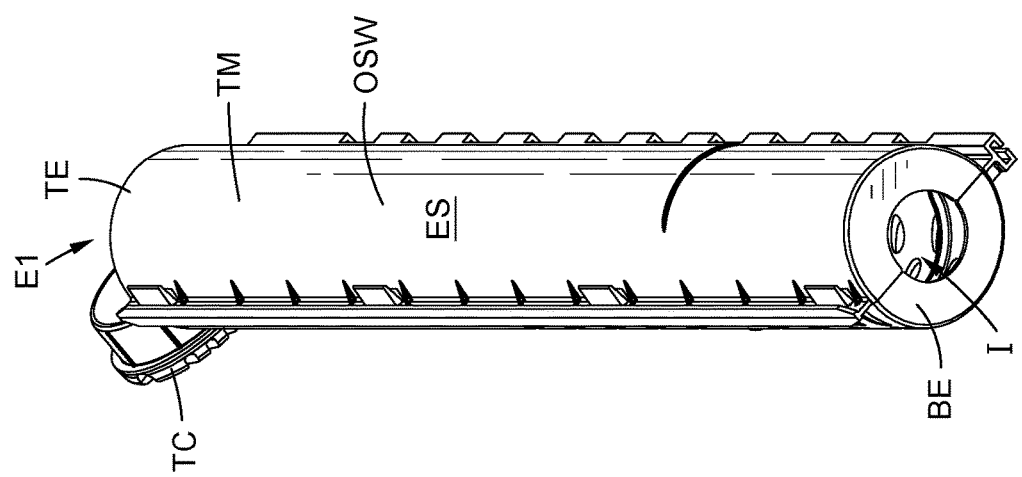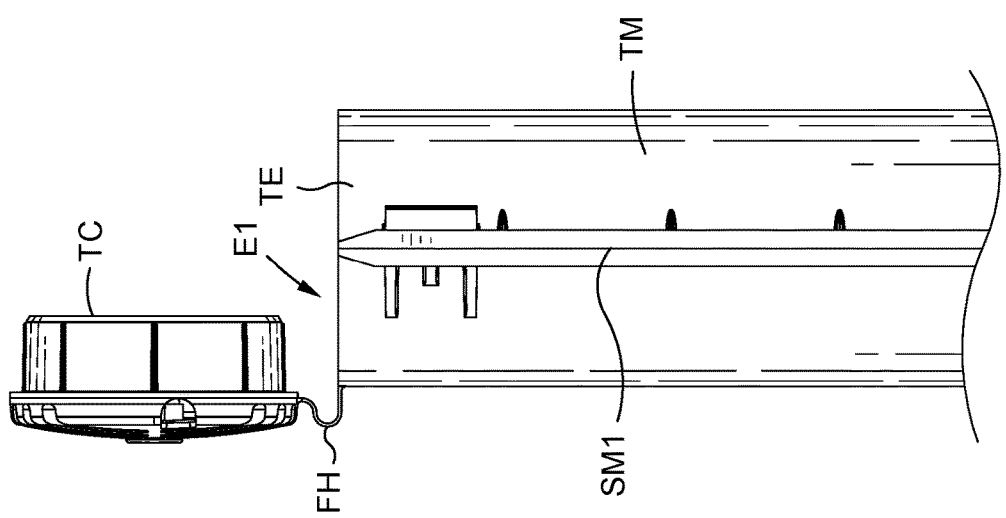

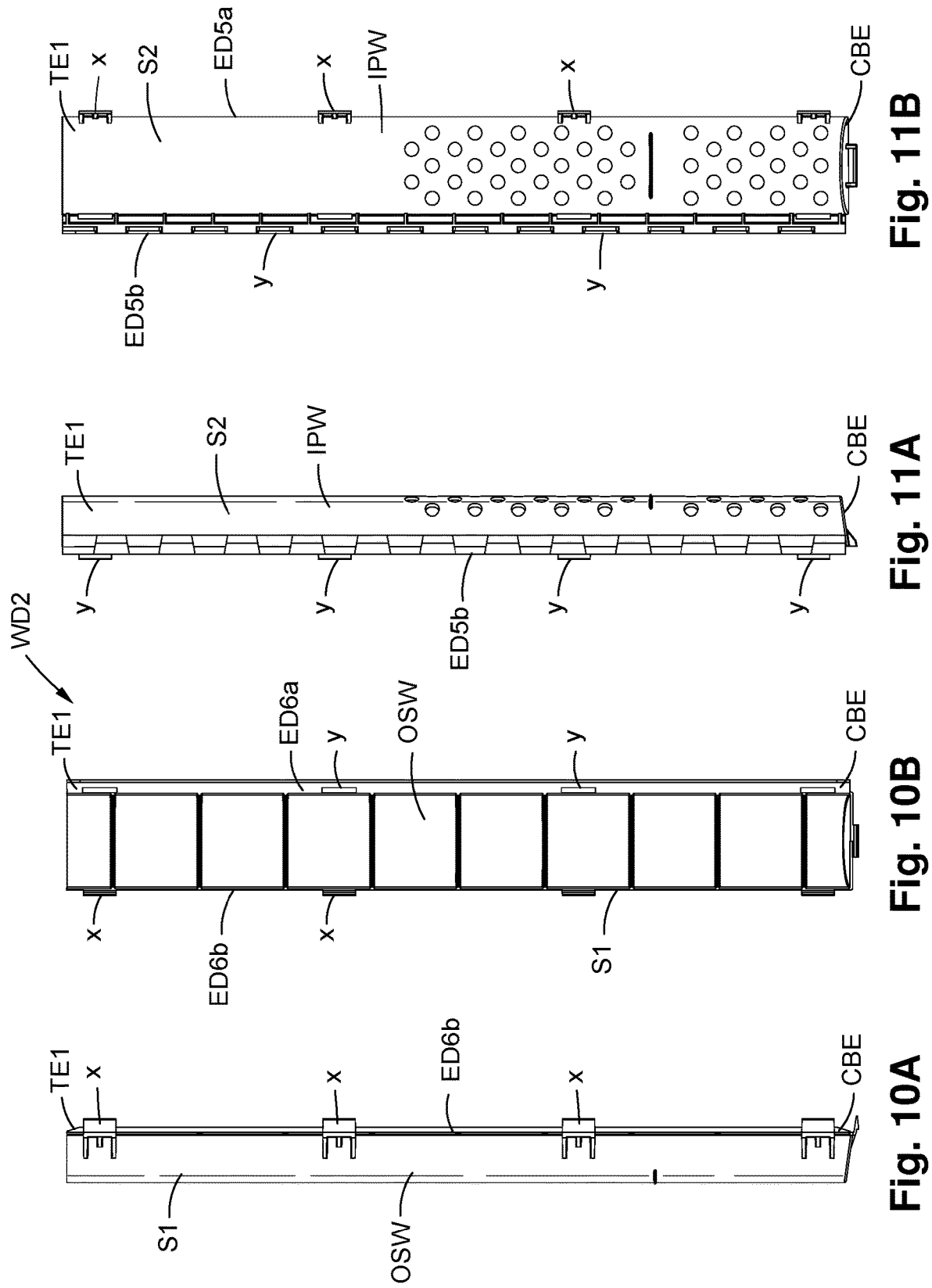

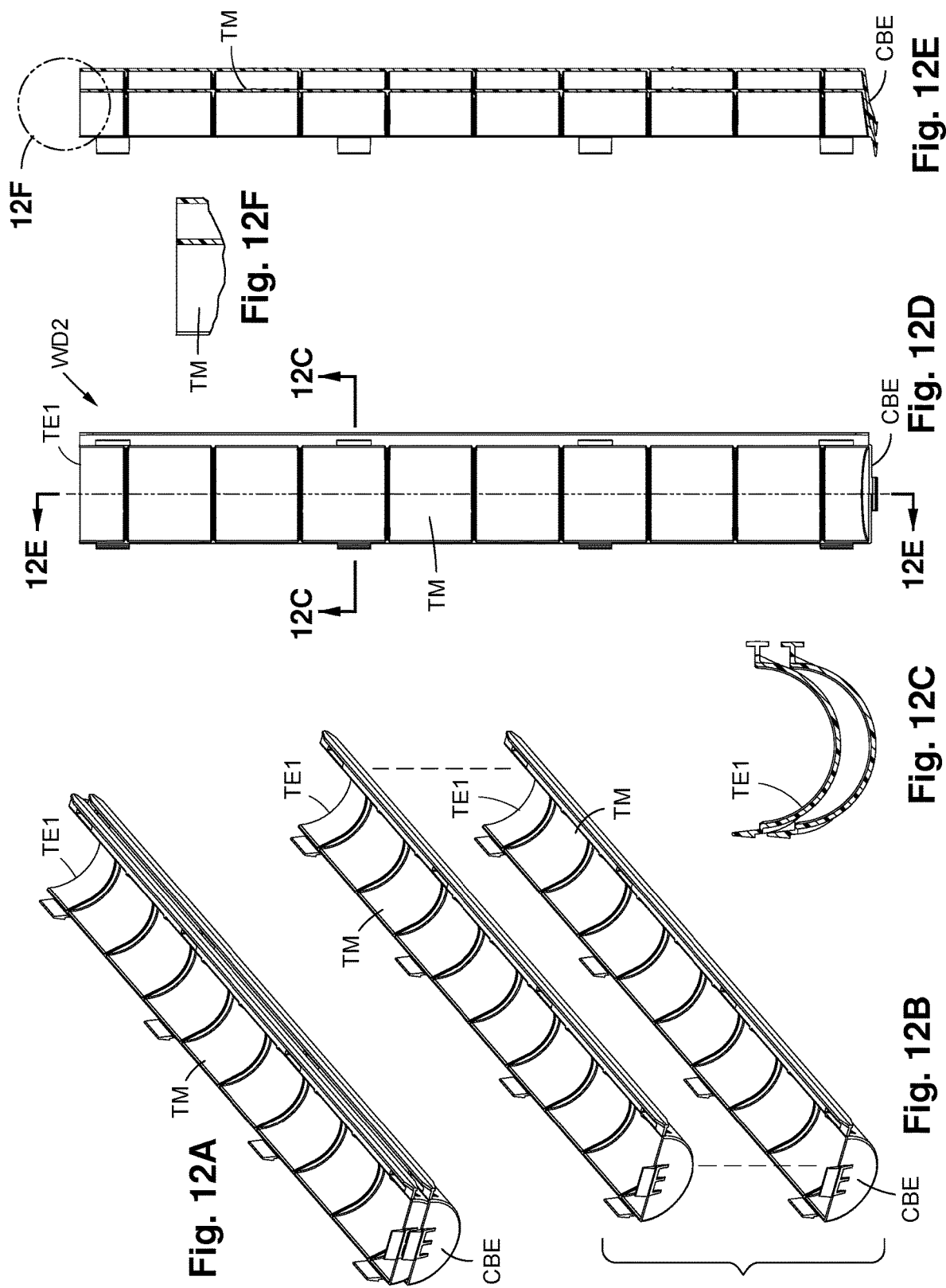

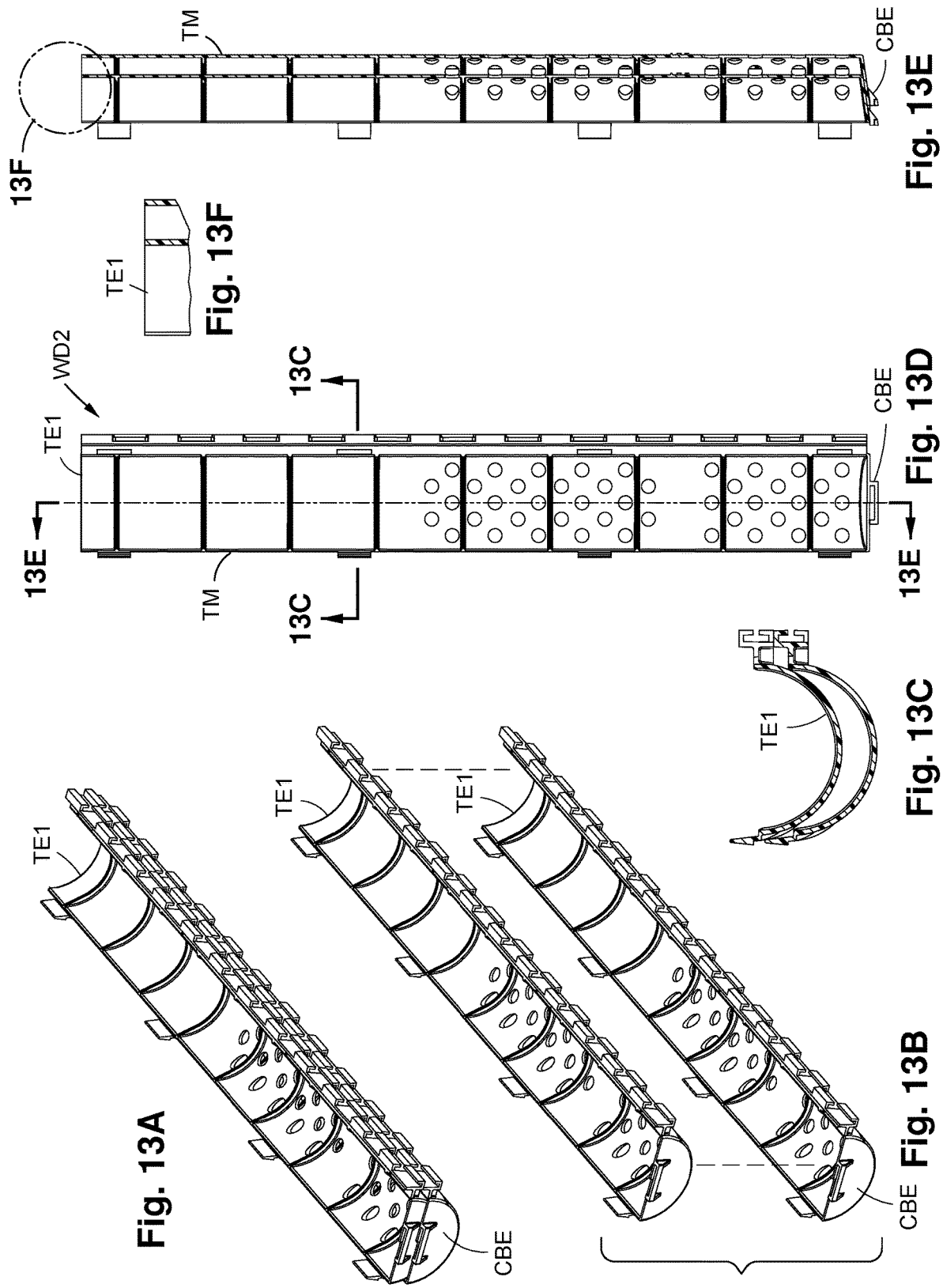

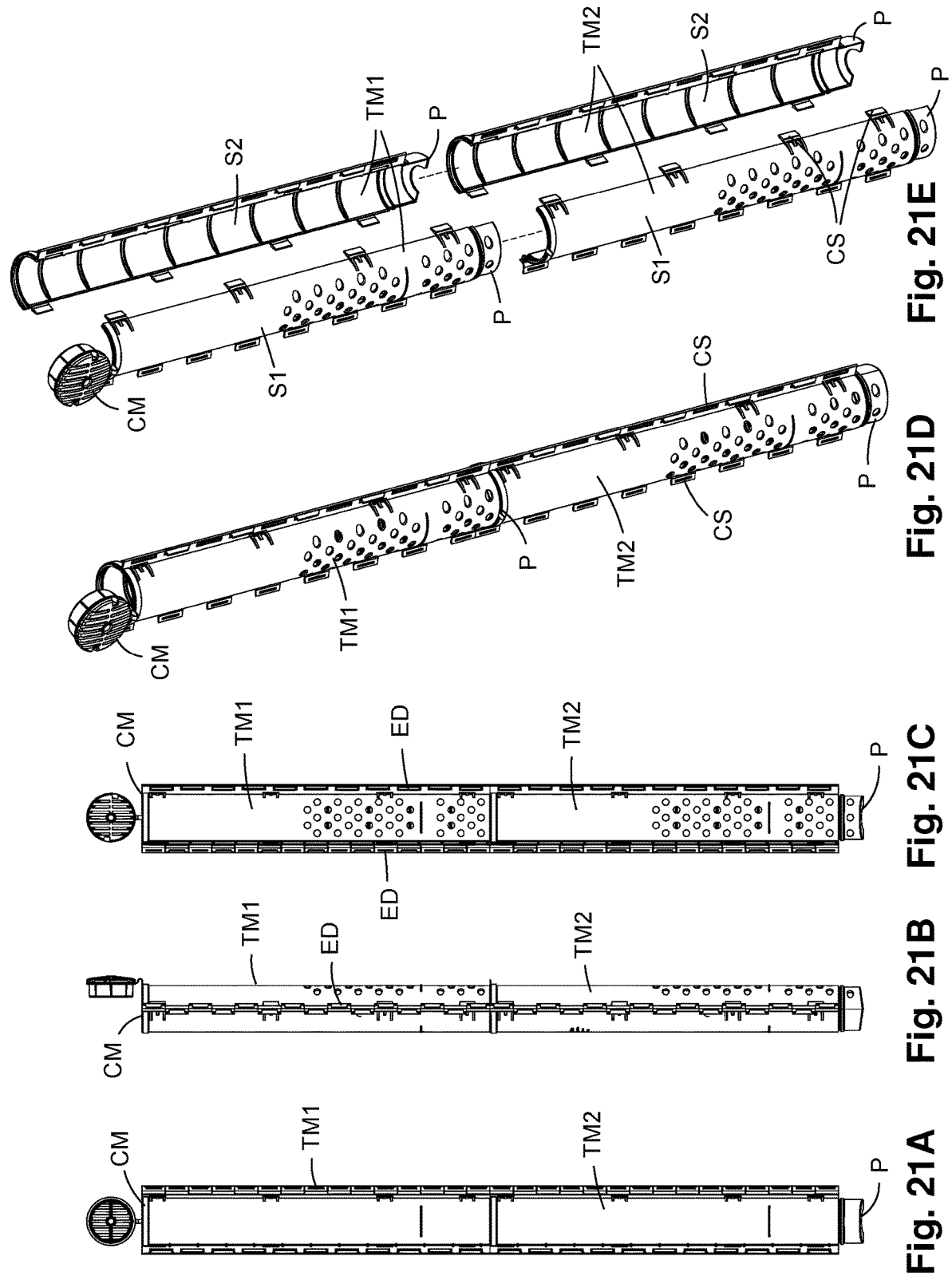

TREE-WATERING DEVICE, SYSTEM AND METHOD

INCORPORATION BY REFERENCE

This non-provisional utility patent application claims the benefit under 35 USC 119(e) of U.S. Provisional Patent Application No. 62/638,886, entitled "Tree-Watering Device, System And Method" filed Mar. 5, 2018, and U.S. Provisional Patent Application No. 62/766,605, filed Dec. 13, 2018; attached hereto as Appendix A. These related applications are incorporated herein by reference and made a part of this application. If any conflict arises between the disclosure of the invention in this non-provisional application and that in the related provisional applications, the disclosure in this non-provisional application shall govern. Moreover, any and all U.S. patents, U.S. patent applications, and other documents, hard copy or electronic, cited or referred to in this application are incorporated herein by reference and made a part of this application.

DEFINITIONS

The words "comprising," "having," "containing," "holding," and "including," and other grammatical forms thereof, are intended to be equivalent in meaning and be open ended in that an item or items following any one of these words is not meant to be an exhaustive listing of such item or items, nor meant to be limited to only the listed item or items.

The word "rectangular" includes square.

The word "round" includes circular, oval, and semi circular.

BACKGROUND

In U.S. Pat. No. 5,528,857, a barrier system for retaining water in the root zone of a tree is discussed. I have invented a tree root watering, management system and method that employs my unique tree-watering device in combination with the barrier panels such as, for example, the rectangular barrier panels disclosed in U.S. Pat. No. 5,528,857.

My system joins the barrier panels together and guides tree roots into deeper ground soil away from shallow soil and obstructions, maintaining the integrity of the tree roots. My system provides deep watering of roots to attract the growth of the tree roots into well-watered deep soil. There are numerous ways of using my system to accomplish deep root watering as subsequently discussed, and thus, watering can be adjusted to the needs of the particular tree and soil requirements.

My system allows for proper aeration of the deep roots, providing oxygen to the roots while allowing toxins and gases (typically ethane) to escape from the soil surrounding the tree. Tree health and survival rate is much higher when roots are not exposed to these toxins. Water may be introduced through my tree-watering device into the soil surrounding the deep tree roots through an access opening in the top or bottom of my device. In one embodiment, an access opening is at the top of my tree-watering device, so tree and root nutrients can be added from the top. The amount and type of nutrients vary depending on the tree and soil requirements.

The number of my tree-watering devices used in my system will vary with the type and size of each tree. Soil requirements will also determine the number of my devices required. While all embodiments of my tree-watering device provide much needed aeration, not all of my devices need to be used exclusively for watering. Each installed device can, however, be used for all three applications: watering, aeration and nutrition. My system using my tree-watering device accomplishes this while maintaining the integrity of the root barrier structure. Neither the conventional root barrier system nor my system is watertight. Delivering the water to the deep roots has other benefits. Run off and evaporation from excessive top watering will be greatly reduced, helping to save on water usage and waste.

SUMMARY

My tree-watering device, system and method have one or more of the features depicted in the embodiments discussed in the section entitled "DETAILED DESCRIPTION OF SOME ILLUSTRATIVE EMBODIMENTS. These features are not listed in any rank order nor is this list intended to be exhaustive. The claims that follow define my device, system, and method, distinguishing them from the prior art; however, without limiting the scope of my device, system, and method as expressed by these claims, in general terms, some, but not necessarily all, of their features are:

One, my system comprises my vertically oriented tree-watering device and a pair of vertically oriented barrier panels sunk into the ground nearby a tree. The tree-watering device is configured to be inserted into the ground nearby a tree planted in the ground and attached between the panels. A connector structure on an exterior of my device interlocks with connector components along edges of the panels. My tree-watering device comprises an elongated tubular member including a hollow interior that extends from a top end of the tubular member to a bottom end of the tubular member. There is an access opening in the top end or the bottom end or both ends of my tree-watering device. The hollow interior extends along a central longitudinal reference line from a top end of the tubular member to a bottom end of the tubular member, Two, a sidewall of the tubular member has in a lower portion thereof one or more openings therein. The lower portion of the sidewall with the one or more openings is at least 12 inches from the top end. When installed with the tubular member oriented vertically and connected between opposed edges of a pair of vertically oriented barrier panels, the lower portion of the sidewall with the one or more openings therein, faces the tree and the top end is at or slightly above the ground surface. This results in pressurized water introduced into the interior of the tubular member to flow out the sidewall of the tubular member through the openings therein in a direction towards the tree and beneath the ground surface at a depth of at least 12 inches, typically ranging generally from 12 to 48 inches.

Three, the tubular member is configured so that the reference line is vertically orientated when the tree-watering device is sunk into the ground in which the tree is planted. The tubular member has a side portion connecting the top end and bottom end that includes a first solid wall and a second perforated wall opposite the first solid wall that faces the tree upon installation of the tree-watering device. The second perforated wall has a solid upper portion and a lower portion thereof with one or more openings therein that are at least 12 inches from the top end. A connector structure on an exterior surface of the tubular member enables the tree-watering device to be attached between aligned edges of the pair tree root barrier panels. The tubular member may have a length from 12 to 48 inches and a diameter from 3 to 6 inches. The solid upper portion of the perforated wall portion extends a predetermined distance from the top end to an intermediate portion of the perforated wall and the lower portion is at least 12 inches from the top end and extends a predetermined distance from the intermediate portion to the bottom end that is at least 12 inches.

Four, the connector structure includes a first connector component and a second connector component that are interactive with corresponding connector components on edges of the pair tree root barrier panels. The first connector component on one side of the tubular member is interactive with a corresponding connector component on an edge of one of the pair. The second connector component on the other side of the tubular member is interactive with a corresponding connector component on an edge of the other of the pair. When my system is assembled these interactive connectors enable my tree-watering device to be attached between aligned edges of a pair of conventional tree root barrier panels.

Five, the tubular member may be cylindrical and formed by connecting together a pair of semi-cylindrical molded plastic elements to form the hollow interior of the tubular member. The semi-cylindrical molded plastic elements may each be configured with edges having fasteners thereat configured to enable these edges of each one of the pair to abut and be attached to form the cylindrical tubular member. One of the semi-cylindrical molded plastic elements forms an outer solid sidewall to provide a barrier that directs downward towards a bottom end pressurized water within the interior of the tubular member. The other semi-cylindrical molded plastic elements forms an inner perforated sidewall having upper and lower portions. Each individual one of the pair of semi-cylindrical molded plastic elements is configured so that a plurality of each said individual ones can be stacked upon each other.

Six, the upper portion provides a solid barrier that extends a predetermined distance from a top end to an intermediate portion of the perforated sidewall. The lower portion has one or more openings therein that allow pressurized water to flow from the interior of the tubular member out these openings. The solid upper portion extends a predetermined distance from near the top end to the intermediate portion of the inner perforated sidewall that is at least 12 inches. The lower portion of the inner perforated sidewall extends a predetermined distance from the intermediate portion to the bottom end that is at least 12 inches.

Seven, the top end tree-watering device may be open. At the open top end may be a detachable cap member configured to be inserted into the open top end of the tubular member. The cap member has an open cover that allows water to be fed into the interior of the tubular member. The bottom end may be open to provide a passageway for water to flow between the open top and bottom ends. Or, if the bottom end is open and the top end is closed.

My method comprises the steps of:
(a) sinking into the ground in which a tree is planted and below the ground surface a plurality of the tree root barrier panels in a vertical orientation,
(b) positioning the panels nearby each other to at least partially encompass roots of the tree,
(c) sinking into the ground between at least one pair of adjacent panels in a vertical orientation a tree-watering device with a top end of a tubular member of the device at or near the surface of the ground and a lower portion with the one or more openings therein facing the tree and being at least 12 inches below the surface of the ground,
(d) introducing pressurized water into the interior of the tubular member so waters flows out the sidewall of the tubular member through the openings therein towards the tree.

DESCRIPTION OF THE DRAWING

Some embodiments of my tree-watering device and method are discussed in detail in connection with the accompanying drawing, which is for illustrative purposes only. This drawing includes the following figures (Figs.), with like numerals and letters indicating like parts:

FIG. 7 is a partial side view of my tree-watering device shown in FIG. 1.

FIG. 8A is a perspective view of my tree-watering device shown in FIG. 1 looking at its bottom end with the solid side facing away from the tree being watered.

FIG. 8B is a perspective view of my tree-watering device shown in FIG. 8A, connected between a pair of adjacent panels.

FIGS. 10A through 14C where:

FIG. 10A is a side view of another embodiment of my water device one of a pair of semi-cylindrical elements forming my device that includes an outer solid sidewall.

FIG. 10B is a front view of the semi-cylindrical element shown in FIG. 10A.

FIG. 11A is a side view of the other of the pair of semi-cylindrical elements forming my device that includes an inner perforated wall.

FIG. 11B is a front view of the semi-cylindrical element shown in FIG. 11A.

FIG. 12A is a perspective view of a pair of semi-cylindrical elements shown in FIGS. 10A and 10B stacked one upon the other.

FIG. 12B is an exploded view of the stacked pair of semi-cylindrical elements shown in FIG. 12A.

FIG. 12C is cross-sectional view taken along line 12C-12C of FIG. 12D.

FIG. 12D is a front view of the stacked pair of semi-cylindrical elements shown in FIG. 12A.

FIG. 12E is a cross-sectional view taken along line 12E-12E of FIG. 12D.

FIG. 12F is an enlarged fragmentary taken along line 12F of FIG. 12E.

FIG. 13A is a perspective view of a pair of semi-cylindrical elements shown in FIGS. 11A and 11B stacked one upon the other.

FIG. 13B is an exploded view of the stacked pair of semi-cylindrical elements shown in FIG. 13A.

FIG. 13C is cross-sectional view taken along line 13C-13C of FIG. 13D.

FIG. 13D is a front view of the stacked pair of semi-cylindrical elements shown in FIG. 13A.

FIG. 13E is a cross-sectional view taken along line 13E-13E of FIG. 13D.

FIG. 13F is an enlarged fragmentary taken along line 13F of FIG. 13E.

FIG. 14C is a perspective view of an assembly of the outer solid sidewall semi-cylindrical element and the inner perforated sidewall semi-cylindrical element.

FIGS. 21A through 21E is another embodiment of my tree-watering system where:

FIG. 21A is a cross-sectional view of one tubular member forming the pair of generally identical tubular members connected together endwise as illustrated in FIGS. 21D and 21E.

FIG. 21B is a side view of the one tubular member show in FIG. 21A.

FIG. 21C is a front view of the one tubular member show in FIG. 21A.

FIG. 21D is a perspective view of an assembly of a pair of the generally identical tubular members shown in FIG. 21A.

FIG. 21E is an exploded perspective view of the assembly shown in FIG. 21D.

DETAILED DESCRIPTION OF SOME ILLUSTRATIVE EMBODIMENTS

Figs A and B (Prior Art)

As illustrated in Figs. A and B, and as disclosed in detail in U.S. Pat. No. 5,528,857, a root barrier system of interconnected, vertically oriented, rectangular barrier panels BP, are sunk into the ground surrounding a tree T to retain water in the root zone of the tree T. The tree roots R, as they grow outwards and upwards from the trunk of the tree T in a horizontal and vertical direction, are directed in a downward direction upon encountering the array of interconnected barrier panels BP forming a root barrier surrounding the tree T.

The barrier panels BP are molded from a plastic such as polypropylene and consequently are flexible. Each of these barrier panels BP is generally of rectangular configuration and has a top edge ED1, a bottom edge ED2, a male connector MC in the form of an elongated T-shaped tongue TG along a side edge ED4, and a female connector FC in the form of a series of aligned C-shaped channels C along an opposed side edge ED3. The male connector MC along the edge ED4 of one barrier panel BP is connected to a complementary female connector FC along the edge ED3 of an adjacent barrier panel. A sufficient number of these barrier panels BP are connected together in a generally circular configuration to surround the tree T. The upper edges ED1 of the interconnected barrier panels BP are slightly above the ground's surface, and the panel's length extends in a downward direction into the ground generally from 12 to 48 inches. The width of the barrier panel BP is generally from 12 to 24 inches, and the thickness of the barrier panel BP is generally from ⅛ to 1 inch.

FIG. 1

Figure 1:
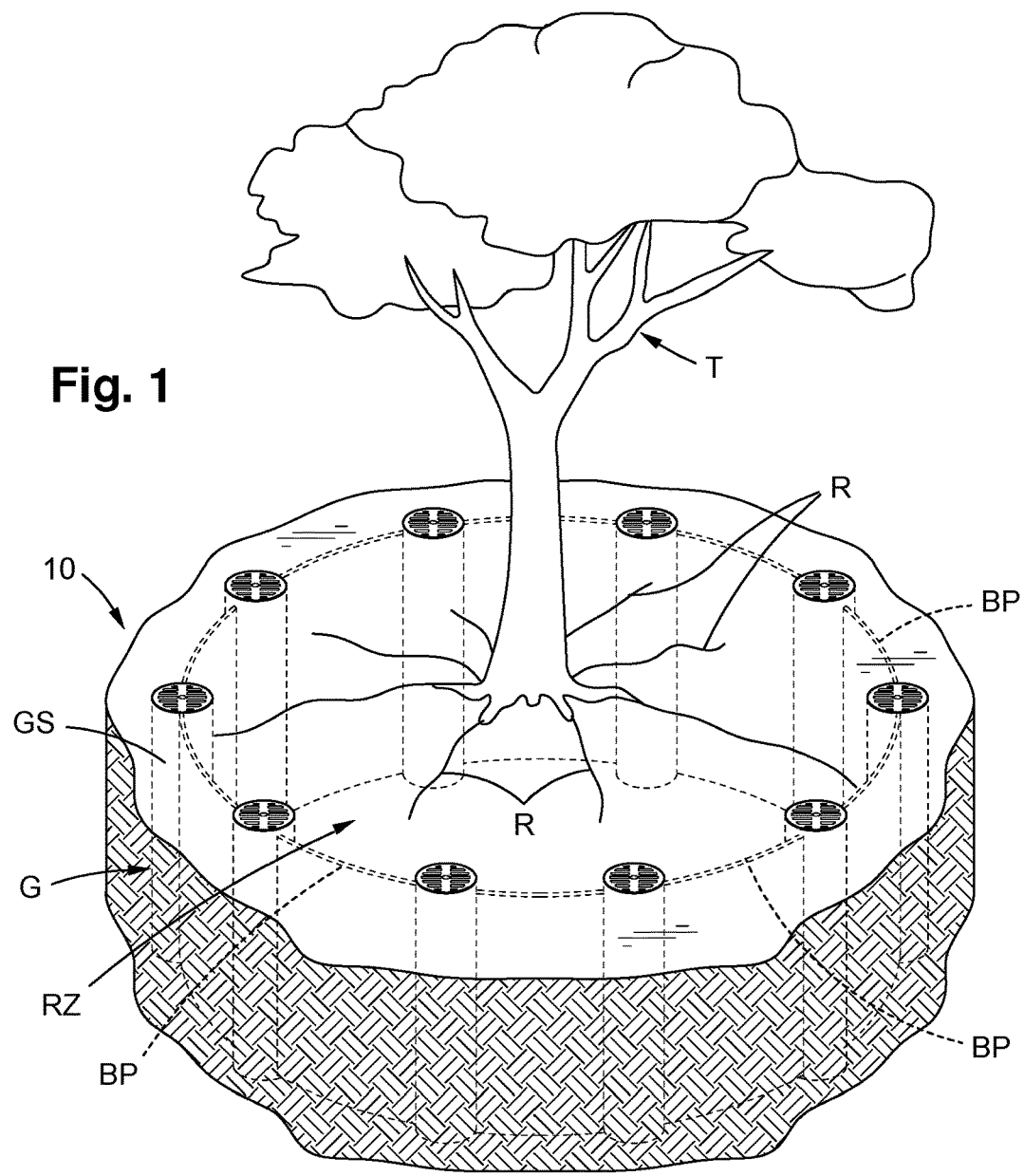
FIG. 1 is a perspective view of one embodiment of my tree-watering system.

As illustrated best in FIG. 1, my system for watering a tree is generally designated by the numeral 10, and comprises a plurality of tree root barrier panels BP and my tree-watering device.

Figure 3:
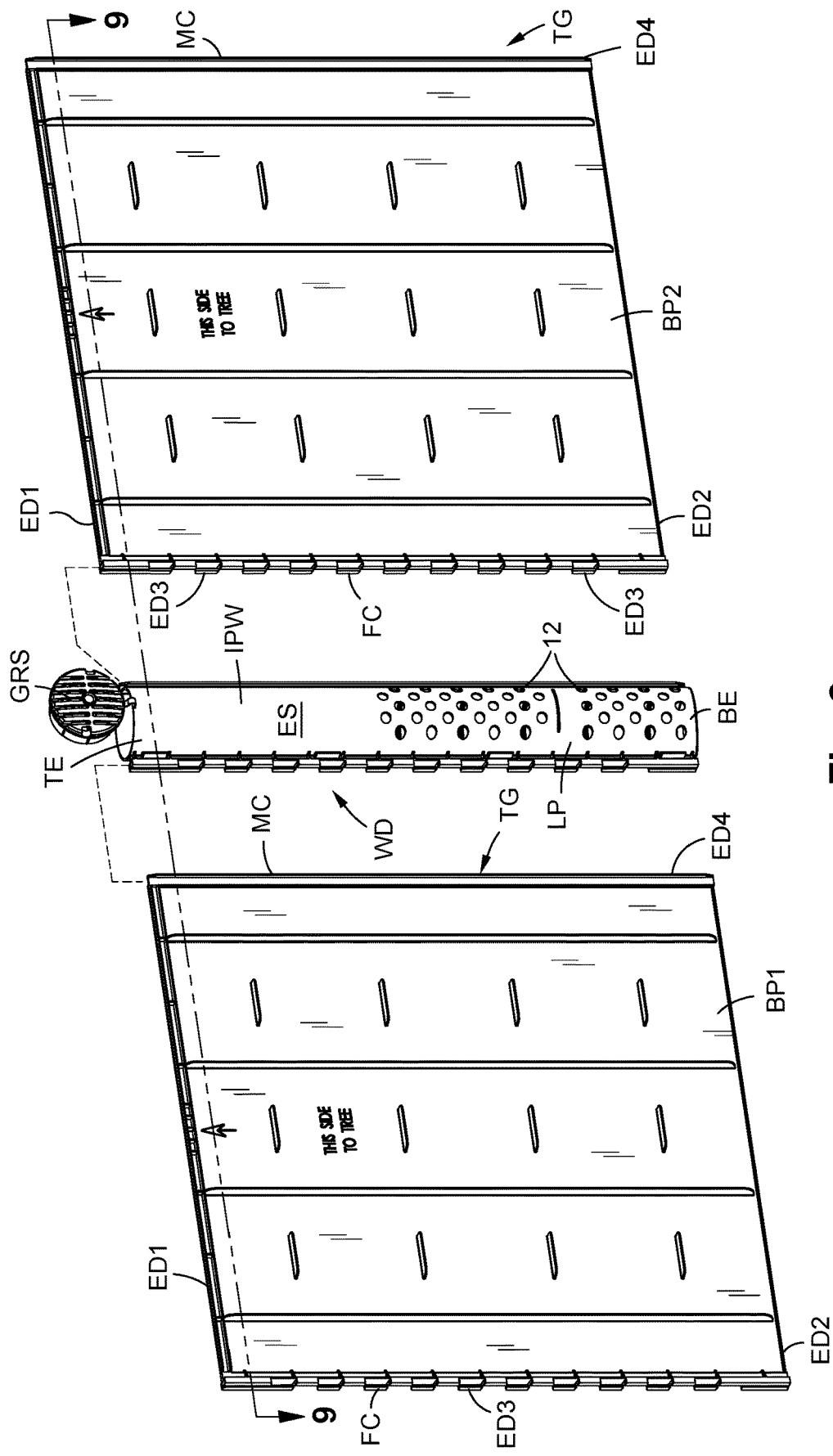
FIG. 3 is an exploded perspective view of my tree-watering device shown in FIG. 1 disposed between a pair of adjacent panels with an inner perforated sidewall of my device facing the tree being watered.
Figure 4:
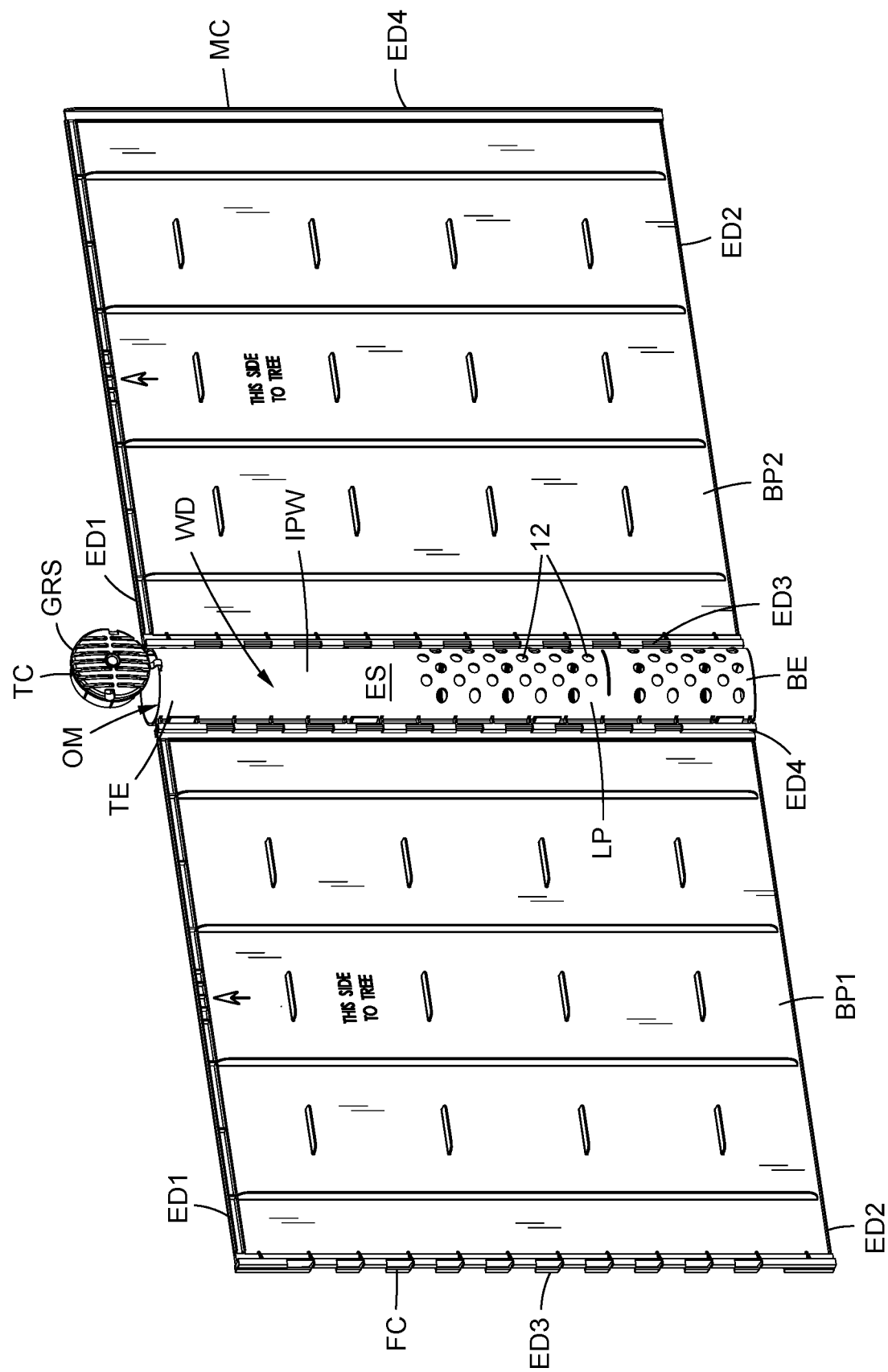
FIG. 4 is a perspective view of my tree-watering device shown in FIG. 3, connected to a pair of adjacent panels and showing the perforated side of my device facing the tree being watered.

The tree root barrier panels BP may, for example, be those disclosed in U.S. Pat. No. 5,528,857. The panels are sunk below the ground surface GS of the ground G in which a tree T is planted. The barrier panels BP are positioned nearby each other to at least partially encompass roots R of the tree T. As shown in FIGS. 3 and 4, one embodiment of my tree-watering device WD having opposed open ends is sunk into the ground G between at least one pair of adjacent panels BP1 and BP2 and connected to edges ED4 of panel BP1 and ED3 of panel BP2. Upon installation, my tree-watering device WD is vertically oriented.

FIGS. 2 Through 9

As illustrated in FIGS. 2-9, the embodiment of my tree-watering device WD comprises an elongated tubular member TM extending along a central longitudinal reference line RL (FIG. 5) from an open top end TE of the tubular member to an open bottom end BE of the tubular member. As best shown in FIGS. 6A through 9B, this first embodiment of the tubular member TM has a pair of molded plastic semi-cylindrical wall sections S1 and S2 that are generally symmetrical. The wall section S1 has a pair of opposed edges ED5a and ED5b (FIG. 6A), and the wall section S2 has a pair of opposed edges ED6a and ED6b (FIG. 6B). A series of spaced apart two-component snap-type fasteners SF are integral with the two-component snap-type fasteners SF and comprising a finger component x and a latch component y. One series of the finger components x are in one row along the edge ED5b of wall section S1, and another series of the latch components y are in one row along the edge ED6b of wall section S2. In a similar manner, another series of the finger components x are in one row along the edge ED6a, and another series of the latch components y are in one row along the edge ED5a. Upon assembly of the sections S1 and S2, these sections are aligned so their inside surfaces IS1 and IS2, respectively, face each other, and the pair of edges ED5a and ED5b contact the pair of edges ED6a and ED6b.

Figure 5:
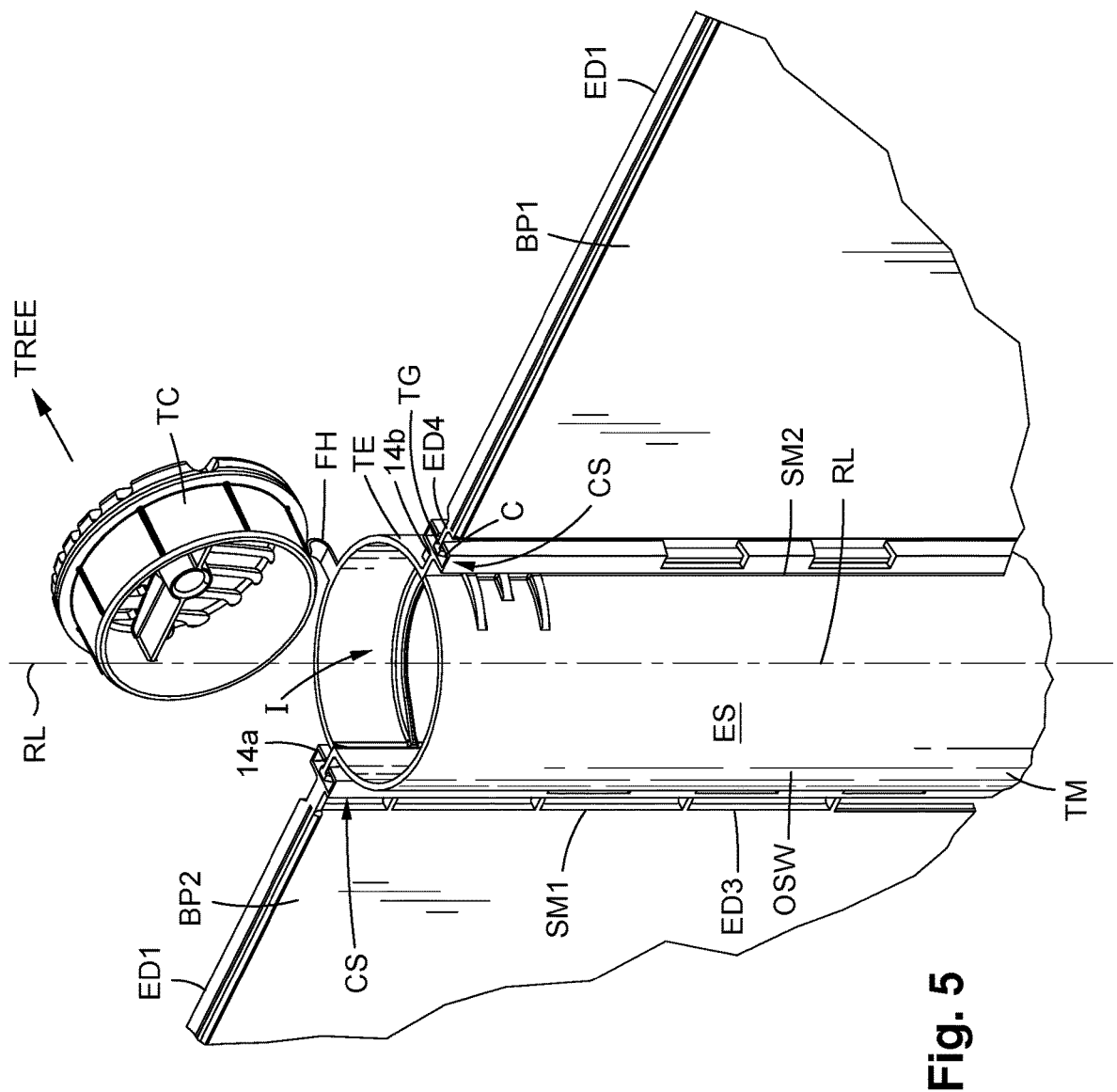
FIG. 5 is an enlarged fragmentary perspective view of the my tree-watering device with the cap open and showing the outer solid side of my device facing away from the tree being watered.
Figure 6A:
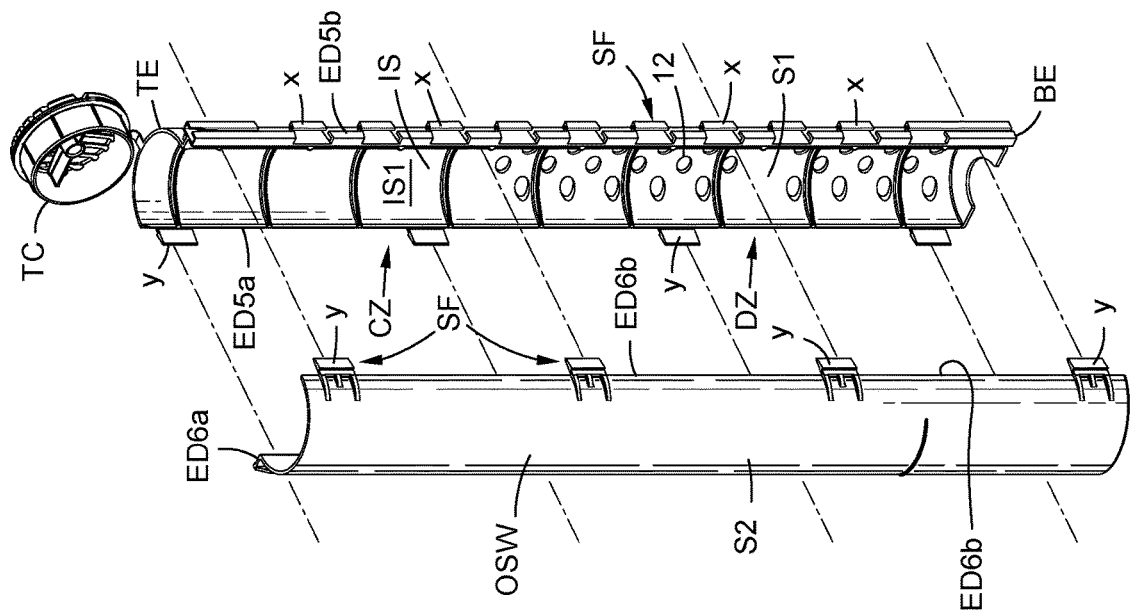
FIG. 6A is a left hand exploded perspective view of my tree-watering device shown in FIG. 1.
Figure 6B:
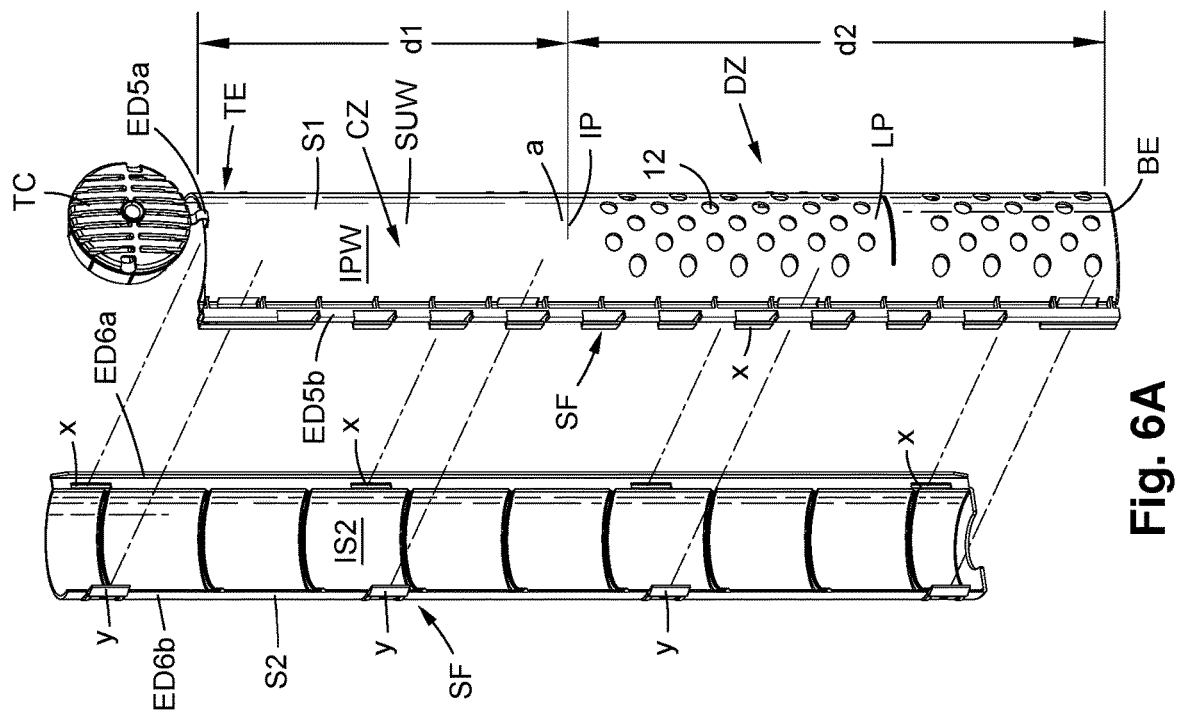
FIG. 6B is a right hand exploded perspective view of my tree-watering device shown in FIG. 1.

Upon attaching the semi-cylindrical wall sections S1 and S2 together, one seam SM1 (FIG. 5) is formed along the abutting pairs of edges ED5a and ED6a and a second seam SM2 (FIG. 5) is formed along the abutting pairs of edges ED5b and ED6b. The finger components x of the two-component snap-type fasteners SF engage and interlock with latch components y of the fasteners SF, snapping together in locking engagement. The semi-cylindrical wall section S1 forms an outer sidewall OSW of the tubular member TM that is solid and impenetrable by water and tree roots, and the other semi-cylindrical wall section S2 has an inner perforated sidewall IPW that water can pass through towards the tree roots. Upon assembly, these semi-cylindrical wall sections S1 and S2 form a cylindrical structure enclosing a hollow cylindrical interior I (FIGS. 9A and 9B) of this embodiment of my tree-watering device. As depicted in FIGS. 6A and 6B, the enclosed interior I comprises an upper water confinement zone CZ and a lower water dispersing zone DZ.

The tubular member TM may have a length from 12 to 48 inches and a diameter from 3 to 6 inches. A solid upper wall portion SUW of the inner perforated wall IPW extends a predetermined distance d1 from the top end TE to an intermediate portion IP of the inner perforated wall as designated by the line a in FIG. 6A. This distance d1 is at least 12 inches, and typically is from 12 to 48 inches (also the length of the water confinement zone CZ). Below this line a, the lower portion LP of the inner perforated sidewall IPW extends from the line a to the bottom end BE a predetermined distance d2 of at least 12 inches, and typically is from 12 to 48 inches (also the length of the water dispersing zone DZ).

Figure 9A:
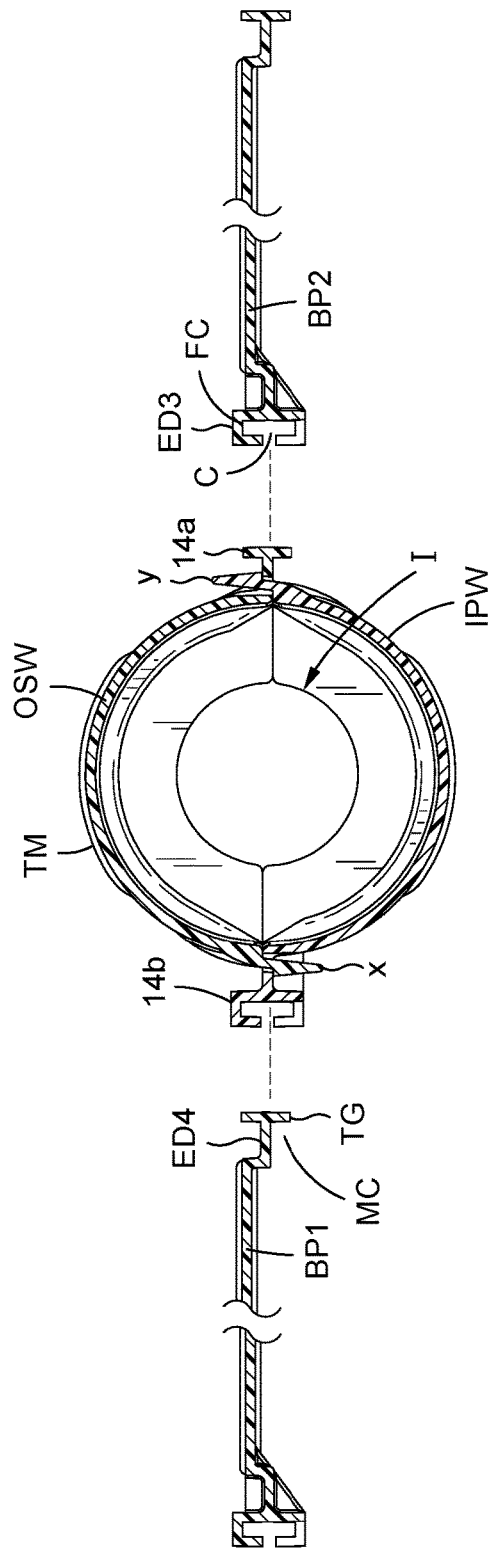
FIG. 9A is a cross-sectional view along line 9-9 of FIG. 3 showing the configuration of my device and the pair of panels prior to connection together.
Figure 9B:
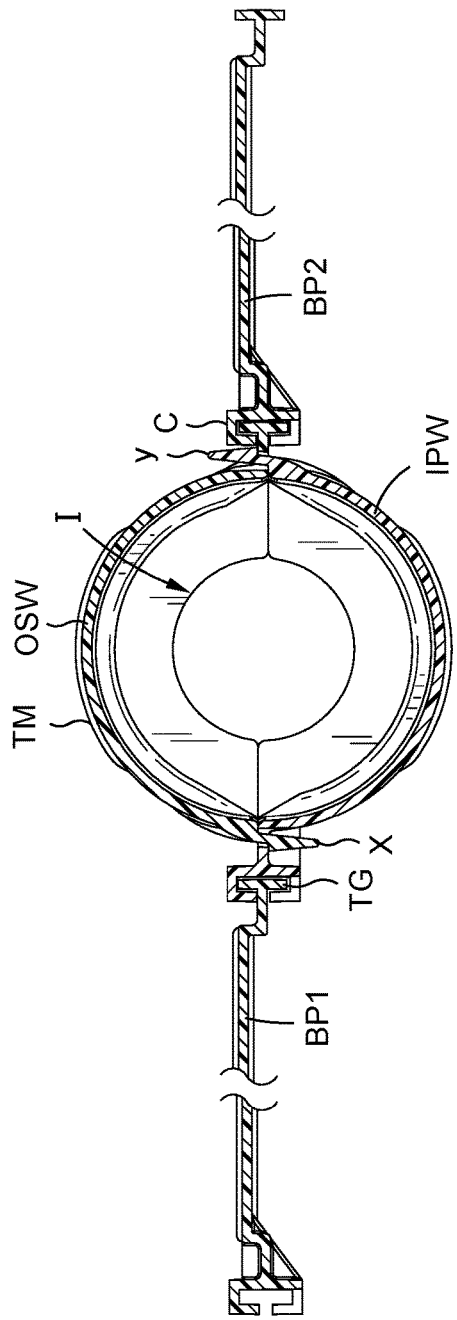
FIG. 9B is a cross-sectional view along line 9-9 of FIG. 3 showing the configuration of my device and the pair of panels after connection together.
Figure 15:
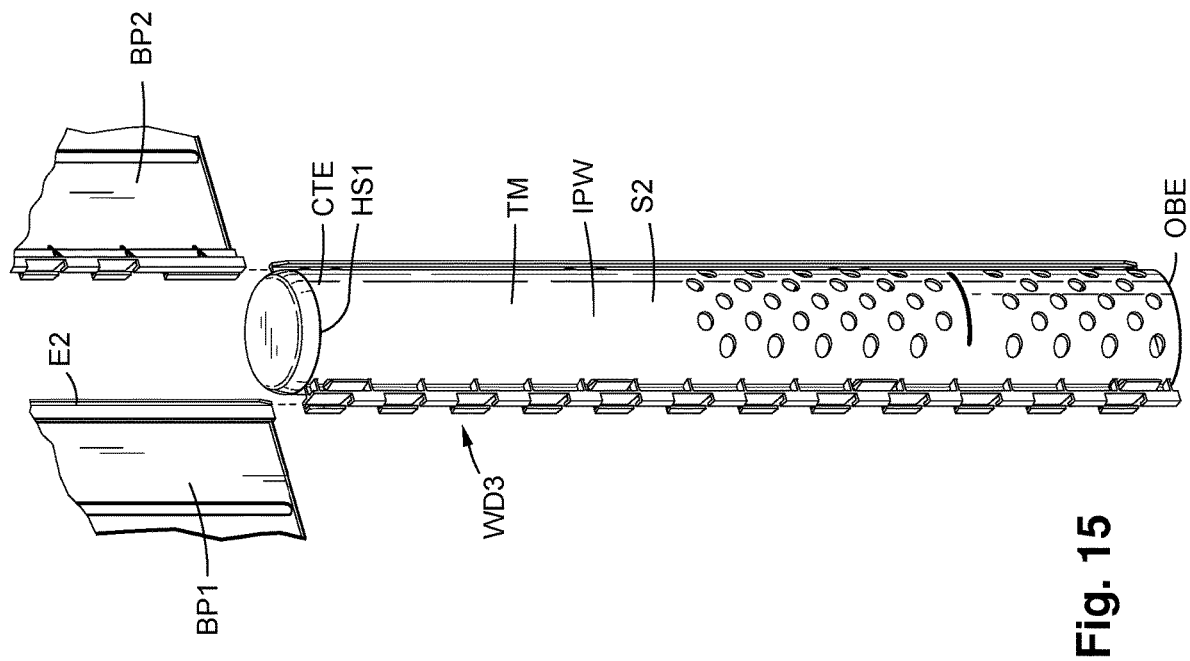
FIG. 15 is a perspective view of another embodiment of my tree-watering device similar to that shown inn FIG. 14C looking downward at a closed top.

As best depicted in FIGS. 3-5 and FIGS. 8B, 9A and 9B, a connector structure CS on an exterior surface ES of the tubular member TM includes a male connector 14a along the seam SM1 (FIG. 5) and a female connector 14b along the seam SM2. As illustrated in FIGS. 9A and 15, the male connector 14a along the edge ED3 of the tree root barrier panel BP2, and a female connector 14b along the edge ED4 of panel BP1 is interactive with a complementary male connector MC along the edge ED4 of the tree root barrier panel BP1 and a complementary female connector FC along the edge ED3 of the tree root barrier panel BP2. Upon attaching the barrier panel BP2 to the tubular member TM, the T-shaped male connector 14a of the tubular member TM slides along the channel C in the female connector FC along the edge ED3 of the barrier panel BP2. Upon attaching the barrier panel BP1 to the tubular member TM, the C-shaped female connector 14b of the tubular member TM slides along the T-shaped tongue TG of the male connector MC along the edge ED4 of the barrier panel BP1.

A grill-type top cap TC is at the open top end TE of the tubular member TM. This top cap TC may be detachable or attached to the tubular member TM by a flexible hinge FH (FIG. 5). The top cap TC is cylindrical and configured to be inserted into and fit snug within the open top end TE (FIGS. 7 through 8B) of the tubular member TM. The top cap TC has an open grill segment GRS (FIG. 2) that allows water to flow into the interior I of the tubular member through the open grill. As shown in FIGS. 8A and 8B, the bottom end BE is open to provide a passageway for water to flow between the open top end TE and out the open bottom end.

Figure 2:
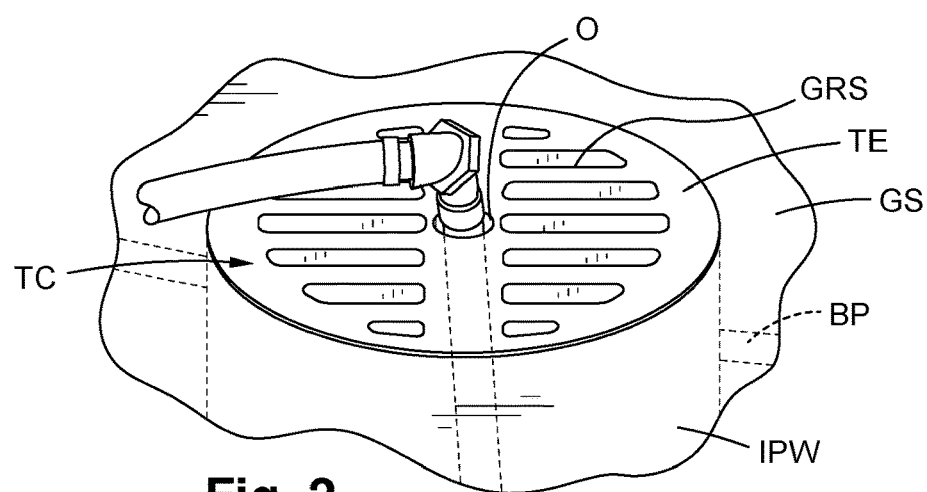
FIG. 2 is a perspective view of a top open end of the embodiment of my tree-watering device shown in FIG. 1.

A central orifice O in the top cap TC can receive an end of a water hose feeding water under pressure into the open end of my tree-watering device into the interior I of the tubular member TM. This pressurized water in the water dispersing zone DZ flows from the interior I through one or more openings 12 in the inner perforated sidewall IPW into the root zone RZ. As best shown in FIG. 3, a lower portion LP of the inner perforated sidewall IPW has the one or more openings 12 that are at least 12 inches below the ground surface GS when my tree-watering device WD is installed as shown in FIG. 1. In other words, in my system 10 water flows from the lower portion LP of the inner perforated sidewall IPW the my tree-watering device and is directed into the root zone RZ at a depth that is at least 12 inches below the ground surface GS. The inner perforated sidewall IPW is oriented so that water flowing from the openings 12 is directed towards the tree T. As depicted in FIG. 2, the top end TE of the tubular member TM is at or slightly above the ground surface GS of the ground G to allow water or nutrients to be introduced through a grill segment GRS, a orifice O, or an open mouth OM (FIG. 4) of the top end TE.

FIGS. 10A Through 14C

As best illustrated in FIGS. 10A through 15, another embodiment of my system 10 employs a tubular member TM having a pair of molded plastic semi-cylindrical wall sections S1 and S2 especially configured to facilitate stacking. As shown in FIGS. 12B through 12E, two or more cylindrical wall sections S1 are stacked together with one of these wall sections nested in the other wall section. As shown in FIGS. 13B through 13E, two or more cylindrical wall sections S2 are stacked together with one of these wall sections nested in the other wall section. Thus, each individual one of the pair of semi-cylindrical molded plastic elements S1 and S2 is configured so that a plurality of each of these individual ones can be stacked upon each other.

Figure 14C:
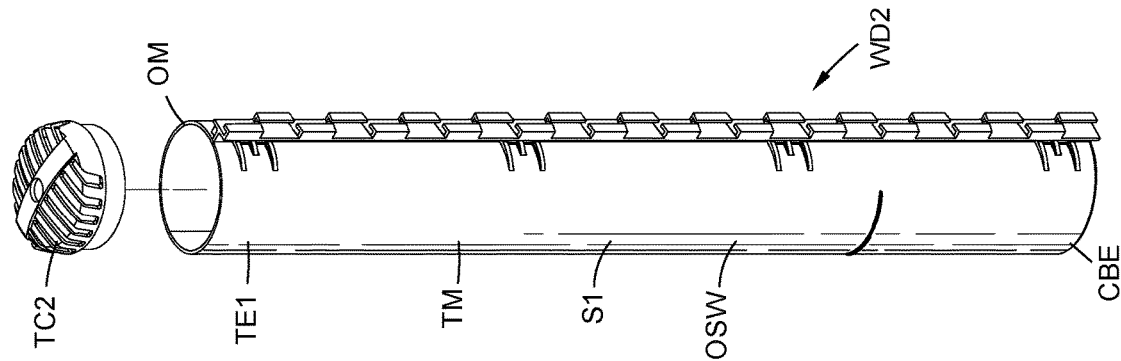
Figure 14B:
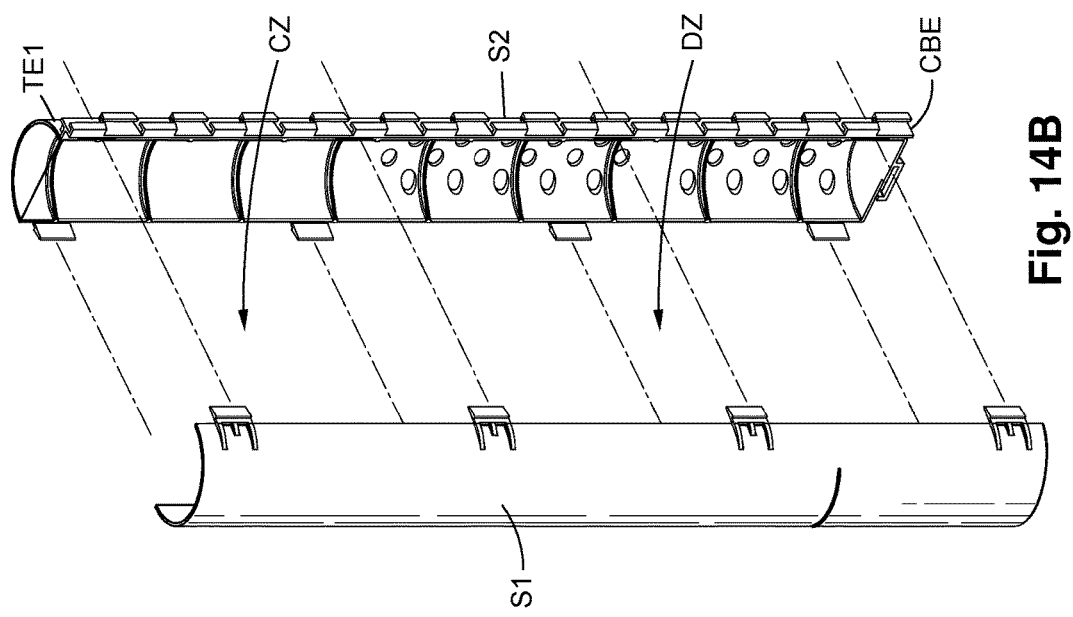
FIG. 14B is a right hand exploded view of my tree-watering device with the outer solid sidewall semi-cylindrical element and the inner perforated sidewall aligned and positioned to be assembled together.
Figure 14A:
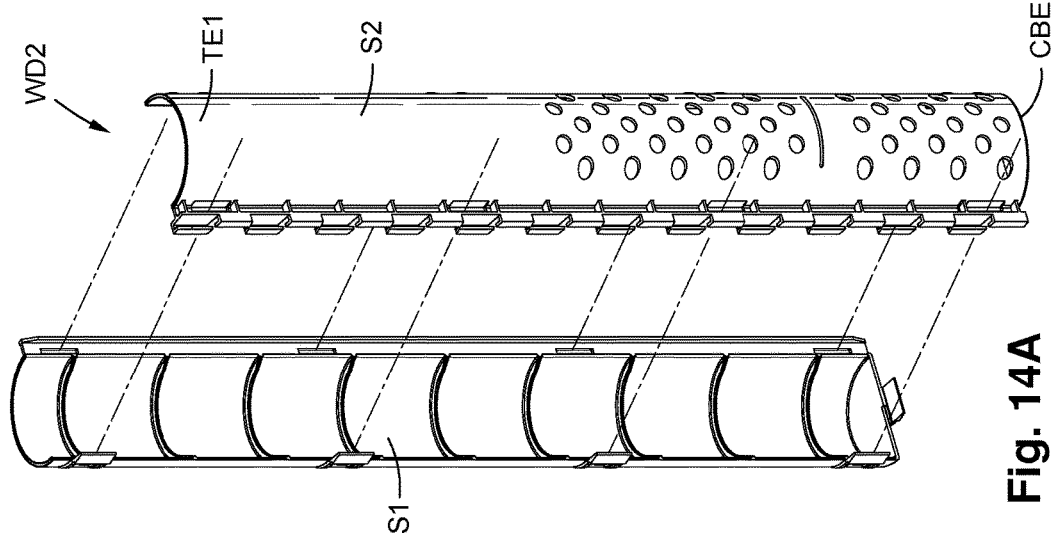
FIG. 14A is a left hand exploded view of my tree-watering device with the outer solid sidewall semi-cylindrical element and the inner perforated sidewall aligned and positioned to be assembled together.

As illustrated in FIG. 14C, as fully assembled and designated by the alpha-numeral WD2, is a second embodiment of my tree-watering device. It is similar to the first embodiment of my tree-watering device WD and is configured to enable the individual inner and outer wall sections S1 and S2 to be stacked together as illustrated in FIGS. 12A through 12E. Upon connection together essentially in the same as discussed above for my tree-watering device WD, the wall sections S1 and S2 form the elongated tubular member TM having open top end TE1. But unlike the first embodiment of my tree-watering device WD, a closed bottom end CBE is formed. After assembly of the wall sections S1 and S2, a detached top cap TC1 is inserted into an open mouth formed at a top end TE1.

Figure 16:
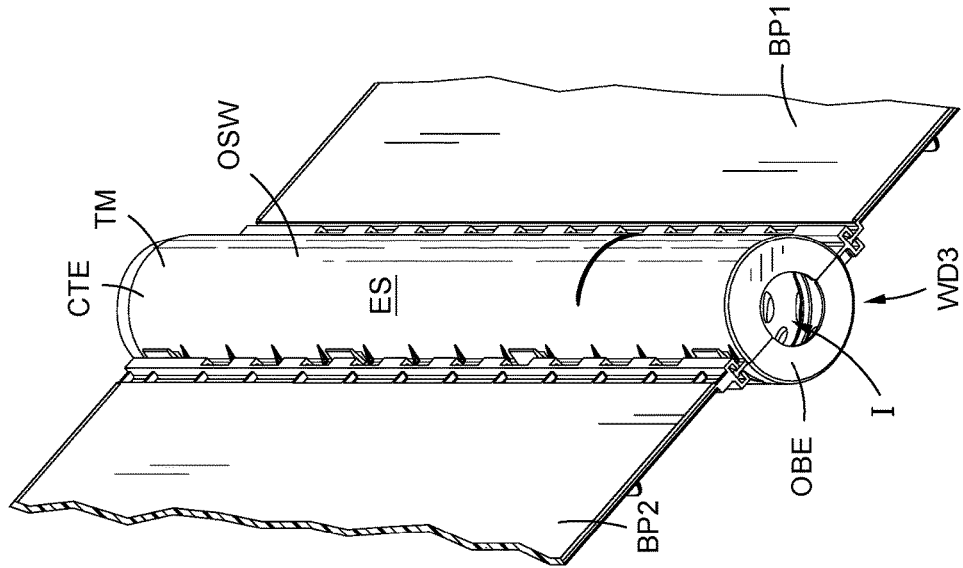
FIG. 16 is a perspective view of the embodiment of my tree-watering device shown in FIG. 15 looking downward at a closed top.

FIGS. 15 and 16

As depicted in FIGS. 15 and 16, an alternate embodiment of my tree-watering device WD3 has an open bottom end OBE and a closed top end CTE. In this embodiment a sprinkler fixture (not shown) of an underground sprinkler system (not shown) is received within the open bottom end OBE. Pressurized water enters the interior I of the tubular member TM of my tree-watering device WD2, filling this interior with water that is forced through the opening 12 into the surrounding ground G towards the tree T.

Figure 1A:
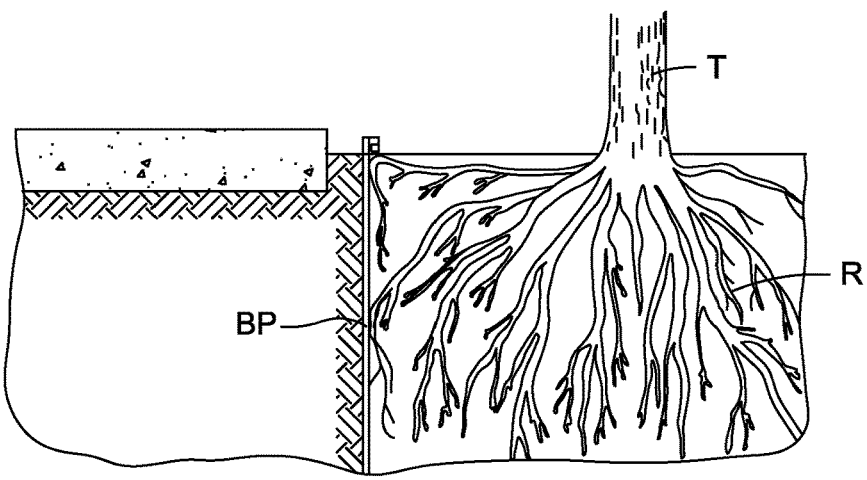
FIG. 1A is a schematic illustration of a prior art conventional root barrier system employing sunken, vertically orientated barrier panels at least partially encompassing roots of a tree to retain water in the tree's root zone and assist in keeping the tree roots below the ground's surface.
Figure 1B:
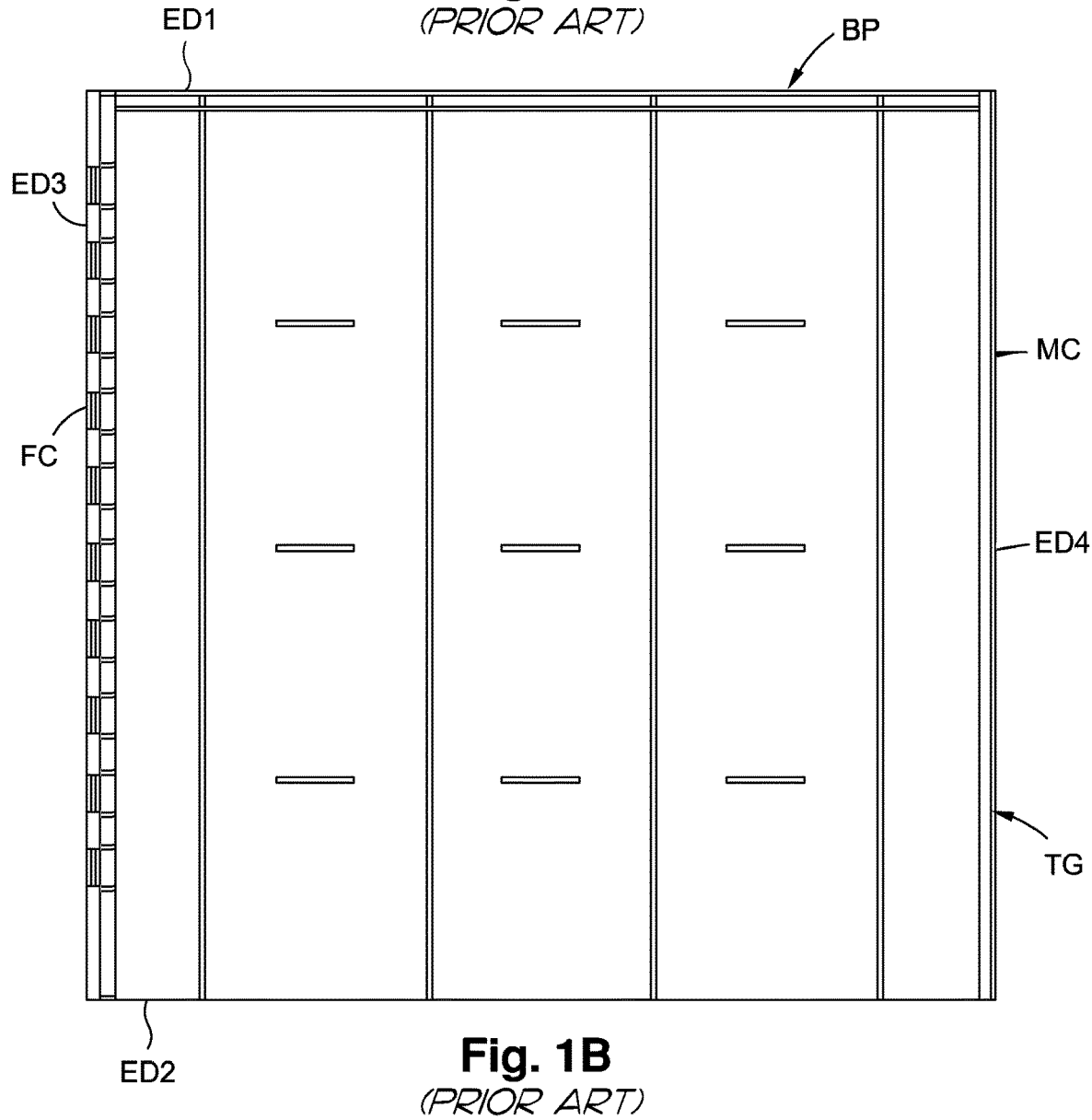
FIG. 1B is a plan view of a conventional root barrier panel used in the prior art system depicted in FIG. 1A.
Figure 1C:
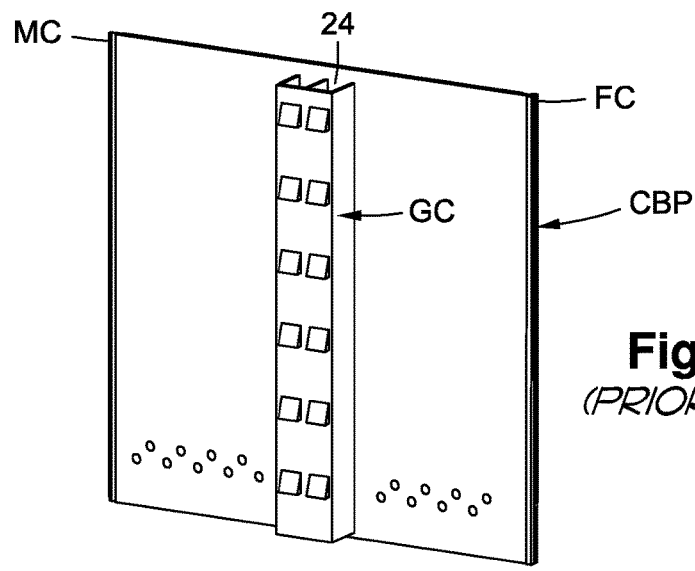
FIG. 1C is a perspective view of another conventional root barrier panel that is used with my tree-watering system as depicted in FIGS. 17A and 17B.
Figure 17A:
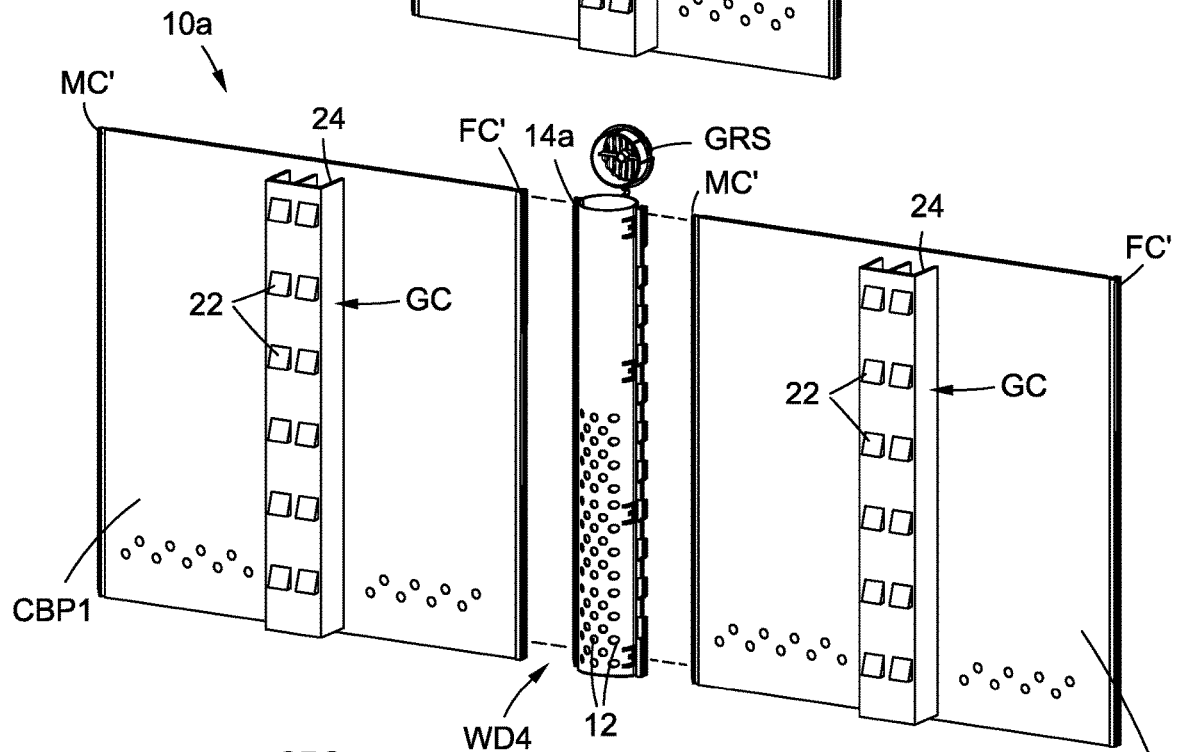
FIG. 17A is an exploded perspective of an alternate embodiment of my tree-watering system using the conventional root barrier panel shown in Fig. C.
Figure 17B:
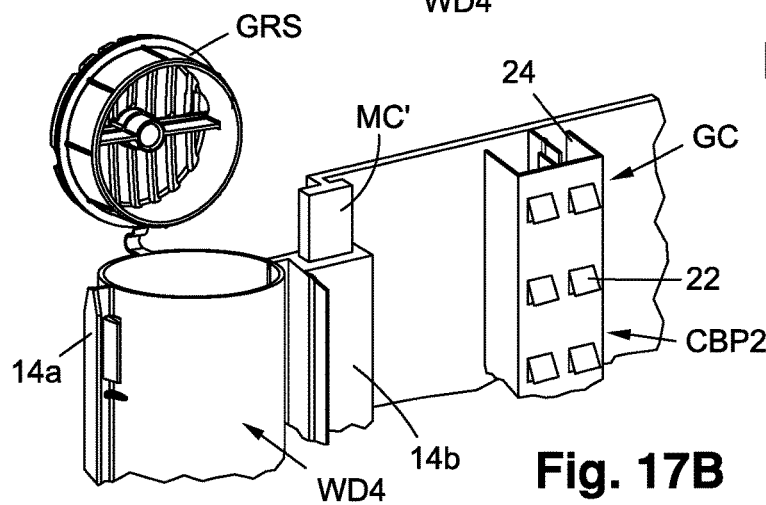
FIG. 17B is a fragmentary perspective showing the root barrier panel of Fig. C connected to an other embodiment of my tree-watering device.

FIGS. 17A and 17B

As illustrated in FIGS. 17A and 17B, an alternate embodiment of my tree-watering system designated by the numeral 10a may use the conventional root barrier panel shown in Fig. C, which is manufactured by Century Products of Las Vegas, Nev. and is designated by the letters CBP. Like my system 10, a tree-watering device WD4 is positioned between a pair of panels CBP1 and CBP2. The tree-watering device WD4 is similar to my other tree-watering device embodiments, and it comprises the tubular member TM including openings 12 and the male connector 14a modified to interlock with a female connector FC' on the one panel CBP1 and the female connector 14b modified to interlock with a male connector MC' on the other panel CBP2. The panels CBP1 and CBP2 include a central vertical oriented guide channel GC with openings 22 along its length and an open top 24 at ground level when my system is installed in the ground. The open top 24 allows water to be introduced into the ground in addition to introducing water into the tree root zone through my tree-watering device WD4.

Figure 18:
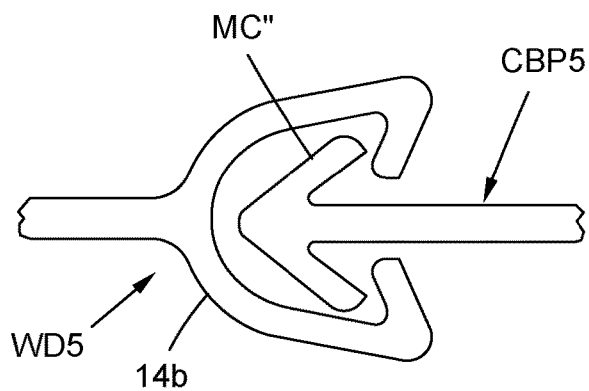
FIG. 18 is a plan view of another alternate embodiment of my tree-watering system using the male connector shown in FIG. 19 and the female connector shown in FIG. 20.
Figure 18A:
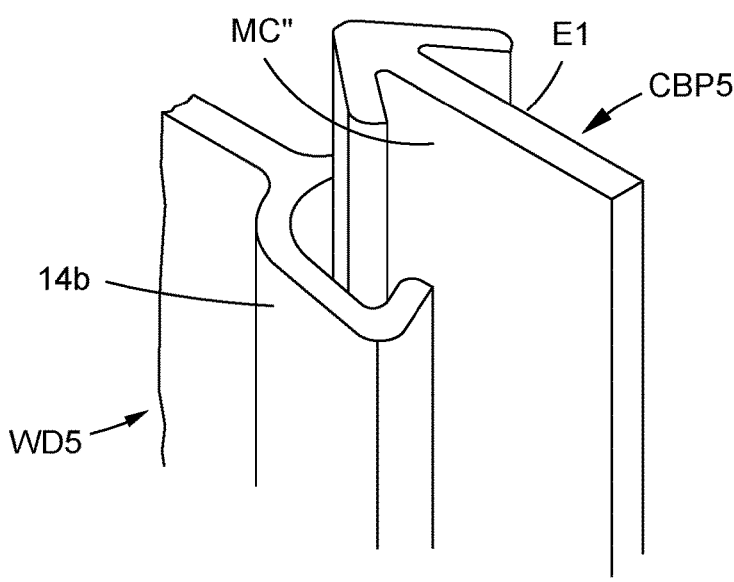
FIG. 18A is a fragmentary perspective of the embodiment of my tree-watering system illustrated in FIG. 18.
Figure 19:
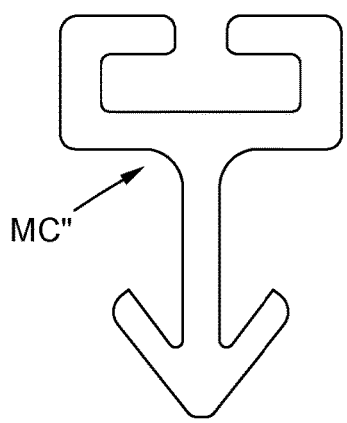
FIG. 19 is a plan view of the male connector used in the embodiment of my tree-watering system illustrated in FIG. 18.
Figure 20:
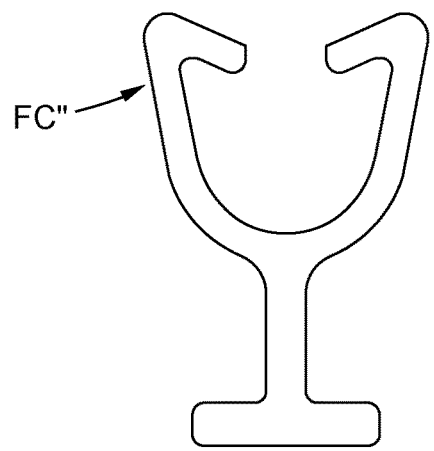
FIG. 20 is a plan view of the male connector used in the embodiment of my tree-watering system illustrated in FIG. 18.

FIGS. 18 Through 20

As illustrated in FIGS. 18 through 20, another alternate embodiment of my tree-watering system may use a different root barrier panel CBP5 and also manufactured by Century Products of Las Vegas, Nev. This root barrier panel CBP5 has opposed ends with the male connector MC" at the end E1 (only the end E1 shown), and the female connector FC" at the other opposed. In this embodiment a tree-watering device WD5 is modified in a manner similar to that shown in FIGS. 17A and 17B with male and female connectors configured to be interactive with corresponding male connectors MC" and female connectors FC". Only a female connector 14b is shown. It is configured the same as the female connector FC" of the root barrier panel CBP5. Like my system 10, the tree-watering device WD5 is positioned between a pair of the panels CBP5 and connected as discussed above.

FIGS. 21A Through 21E

The embodiment of my tree-watering device shown in FIGS. 21A through 21E employs a plurality of elongated cylindrical tubular members TM1 and TM2 that are identical to each other and similar to the tubular members of the other embodiments. In this embodiment each member TM1 and TM2 is of the same general configuration and dimensions, and they are connected together endwise as best shown in FIGS. 21D and 21E. Like the other embodiments, the tubular members TM1 and TM2 comprise a pair of semi-cylindrical molded plastic elements to provide a hollow interior of each tubular member TM1 and TM2 that extends from an open top end of the tubular member to a bottom end of the tubular member. The semi-cylindrical molded plastic elements are each configured with edges ED having fasteners therein configured to enable the edges of each one of the pair to abut and be attached to form the individual cylindrical tubular members TM1 and TM2.

As best depicted in FIGS. 21D and 21E, upper open ends of each of the tubular members TM1 and TM2 have an inside diameter of predetermined dimensions, and at each of their lower ends a reduced diameter projection P. The projections each have an outside diameter equal that of the inside diameter of the open upper end. This enables the reduced diameter projection P at the lower end of the tubular member TM1 to be inserted into the upper open end of the member TM2. In other words the opposed ends of the tubular member TM1 and TM2 are configured to enable at least one pair of the members to be connected together endwise. A detachable cap member CM is inserted into the open upper end of the tubular member TM1. Upon assembly, the pair of tubular members TM1 and TM2 are connected together to form this embodiment of an elongated tubular member depicted in FIG. 21D.

Like the other embodiments, a connector structure CS on an exterior surface of the assembly of the tubular members TM1 and TM2 enables the tree-watering device to be attached between aligned edges of a pair tree root barrier panels. Like the other embodiments, one of said semi-cylindrical molded plastic elements forms an outer solid sidewall providing a barrier that directs downward towards the bottom end pressurized water in the interior of the tubular member. The other semi-cylindrical molded plastic elements forms an inner perforated sidewall having a solid upper portion that extends a predetermined distance from the top end to an intermediate portion of said perforated sidewall and a lower portion having one or more openings therein that allows pressurized water to flow from the interior of the tubular member out said openings.

The tubular members each have a predetermined length and a predetermined diameter. The solid upper portion extends a predetermined distance from near the top end to the intermediate portion of the inner perforated sidewall that is at least 12 inches and the lower portion of the inner perforated sidewall extends a predetermined distance from the intermediate portion to the bottom end that is at least 12 inches.

Method

As illustrated by the drawing and the above discussion, my method of watering the tree T comprises the steps of:
 (a) sinking into the ground G in which the tree T is planted and below the surface GS thereof a plurality of the tree root barrier panels BP in a vertical orientation,
 (b) positioning the panels BP nearby each other to at least partially encompass roots R of the tree T,
 (c) sinking into the ground G between at least one pair of adjacent panels BP1 and BP2 in a vertical orientation the tree-watering device WD with the top end TE of its tubular member TM at or slightly above the surface GS of the ground G and a lower portion of the tree-watering device WD with the one or more openings 12 therein facing the tree T and being at least 12 inches below the surface of the ground,
 (d) introducing pressurized water into the interior I of the tubular member TM so waters flows out an inner perforated sidewall IPW of the tubular member through the openings 12 therein towards the tree T.

SCOPE OF THE INVENTION

The above presents a description of the best mode I contemplate of carrying out my tree-watering device and method and of the manner and process of making and using them, in such full, clear, concise, and exact terms as to enable a person skilled in the art to make and use. My tree-watering device, system and method are, however, susceptible to modifications and alternate constructions from the illustrative embodiments discussed above which are fully equivalent. Consequently, it is not the intention to limit my tree-watering device, system and method to the particular embodiments disclosed. On the contrary, my intention is to cover all modifications and alternate constructions coming within the spirit and scope of my tree-watering device, system and method as generally expressed by the following claims, which particularly point out and distinctly claim the subject matter of my invention:

The invention claimed is:

1. A tree-watering device adapted to be inserted into the ground nearby a tree planted in the ground, said tree-watering device comprising
   an elongated tubular member having a longitudinal reference line and including an hollow interior that extends along the reference line from a top end of the tubular member to a bottom end of the tubular member,
   said tubular member is configured (a) so that the reference line is vertically orientated when the tree-watering device is sunk into the ground in which the tree is planted and (b) to be attached between a pair of vertically oriented tree root barrier panels sunk into the ground nearby said tree,
   said tubular member having a side portion connecting the top end and bottom end that includes a first solid wall and a second perforated wall opposite the first solid wall that faces the tree upon installation of the tree-watering device,
   said second perforated wall having a solid upper portion and a lower portion thereof with one or more openings therein that are at least 12 inches from the top end, and
   a connector structure on an exterior surface of the tubular member that enables the tree-watering device to be attached between aligned edges of the pair tree root barrier panels,
the connector structure comprises
   a row of female locking elements on one wall of the side portion of the tubular member and a row of male locking elements on the other wall of said side portion,
   said one row of female locking elements configured to interconnected with corresponding male locking components along a vertically oriented edge of one of the pair tree root barrier panels and
   said one row of male locking elements opposed to the female locking elements and configured to interconnected with corresponding female locking components along a vertically oriented edge of the other of the pair tree root barrier panels.

2. The tree-watering device of claim 1 where the tubular member has a length from 12 to 48 inches and a diameter from 3 to 6 inches, and said solid upper portion of the perforated wall portion extends a predetermined distance from the top end to an intermediate portion of said perforated wall and said lower portion is at least 12 inches from the top end and extends a predetermined distance from said intermediate portion to the bottom end that is at least 12 inches.

3. The tree-watering device of claim 1 where the connector structure on an exterior surface of the tubular member comprises first and second connector components that are interactive with corresponding connector components on edges of the pair tree root barrier panels, the first connector component on one side of the tubular member being interactive with a corresponding connector component on an edge of one of the pair and the second connector component on the other side of the tubular member being interactive with a corresponding connector component on an edge of the other of the pair, thereby enabling the tree-watering device to be attached between aligned edges of the pair tree root barrier panels.

4. A tree-watering device comprising
   an elongated cylindrical tubular member formed by connecting together a pair of semi-cylindrical molded plastic elements to provide a hollow interior of the tubular member from an open top end of the tubular member to a bottom end of the tubular member,
   said semi-cylindrical molded plastic elements each configured with edges having fasteners thereat configured to enable said edges of each one of the pair to abut and be attached to form said cylindrical tubular member,
   a connector structure on an exterior surface of the tubular member that enables the tree-watering device to be attached between aligned edges of a pair tree root barrier panels,
   one of said semi-cylindrical molded plastic elements forming an outer solid sidewall providing a barrier that directs downward towards the bottom end pressurized water in the interior of the tubular member,
   the other of said semi-cylindrical molded plastic elements forming an inner perforated sidewall having a solid upper portion that extends a predetermined distance from the top end to an intermediate portion of said perforated sidewall and a lower portion having one or more openings therein that allow pressurized water to flow from the interior of the tubular member out said openings,
   said tubular member having a length from 12 to 48 inches and a diameter from 3 to 6 inches, and said solid upper portion extends a predetermined distance from near the top end to the intermediate portion of said inner perforated sidewall that is at least 12 inches and that said lower portion of said inner perforated sidewall extends a predetermined distance from said intermediate portion to the bottom end that is at least 12 inches.

5. The tree-watering device of claim 4 where the bottom end is open and the top end is closed and where each individual one of the pair of semi-cylindrical molded plastic elements is configured so that a plurality of each said individual ones can be stacked upon each other.

6. The tree-watering device of claim 4 where the connector structure on an exterior surface of the tubular member comprises first and second connector components that are interactive with corresponding connector components on edges of the pair tree root barrier panels, the first connector component on one side of the tubular member being interactive with a corresponding connector component on an edge of one of the pair and the second connector component on the other side of the tubular member being interactive with a corresponding connector component on an edge of the other of the pair, thereby enabling the tree-watering device to be attached between aligned edges of the pair tree root barrier panels.

7. A tree-watering device comprising
   a plurality of elongated cylindrical tubular members having opposed ends configured to enable at least one pair of the members to be connected together endwise,
   each member of the pair being of the same general configuration and formed by connecting together a pair of semi-cylindrical molded plastic elements to provide a hollow interior of the tubular member from an open top end of the tubular member to a bottom end of the tubular member,
   said semi-cylindrical molded plastic elements each configured with edges having fasteners thereat configured to enable said edges of each one of the pair to abut and be attached to form said cylindrical tubular member, a connector structure on an exterior surface of the tubular member that enables the tree-watering device to be attached between aligned edges of a pair tree root barrier panels, one of said semi-cylindrical molded plastic elements forming an outer solid sidewall providing a barrier that directs downward towards the bottom end pressurized water in the interior of the tubular member, the other of said semi-cylindrical molded plastic elements forming an inner perforated sidewall having a solid upper portion that extends a predetermined distance from the top end to an intermediate portion of said perforated sidewall and a lower portion having one or more openings therein that allow pressurized water to flow from the interior of the tubular member out said openings, said tubular member having a predetermined length and a predetermined diameter, and said solid upper portion extends a predetermined distance from near the top end to the intermediate portion of said inner perforated sidewall that is at least 12 inches and that said lower portion of said inner perforated sidewall extends a predetermined distance from said intermediate portion to the bottom end that is at least 12 inches.

8. A system for watering a tree that joins barrier panels together to guide tree roots into deeper below the surface of the ground away from shallow soil and obstructions, maintaining the integrity of the tree roots to provide deep watering of roots to attract the growth of the tree roots into well-watered deep soil, said system comprising a plurality of tree root barrier panels sunk below the surface of the ground in which the tree is planted and positioned nearby each other to encompass roots of the tree, and sunk into the ground between at least one pair of adjacent panels and connected to edges of the panels, a vertically oriented tree-watering device comprising an elongated tubular member that extends from a top end of the tubular member to a bottom end of the tubular member, said top end of the tubular member being positioned to allow pressurized water to flow through an end into the interior and out a sidewall of the tubular member that has in a lower portion thereof one or more openings therein that allows water to flow from the interior into the ground at least 12 inches below the surface of the ground, said lower portion oriented so that water flowing from said one or more openings is directed towards the tree roots and that includes a first solid wall and a second perforated wall including said one or more openings that faces the tree roots upon installation of the tree-watering device.

* * * * *